United States Patent
Avery et al.

(10) Patent No.: US 12,189,855 B2
(45) Date of Patent: Jan. 7, 2025

(54) SCHEDULING HAPTIC FEEDBACK

(71) Applicant: CAMBRIDGE MECHATRONICS LIMITED, Cambridge (GB)

(72) Inventors: Christopher Richard Avery, Cambridge (GB); Nils Darphin, Cambridge (GB); Thomas James Powell, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 23 days.

(21) Appl. No.: 17/610,105

(22) PCT Filed: May 15, 2020

(86) PCT No.: PCT/GB2020/051203
§ 371 (c)(1),
(2) Date: Nov. 9, 2021

(87) PCT Pub. No.: WO2020/229845
PCT Pub. Date: Nov. 19, 2020

(65) Prior Publication Data
US 2022/0244783 A1    Aug. 4, 2022

(30) Foreign Application Priority Data

May 15, 2019 (GB) ..................... 1906852

(51) Int. Cl.
*G06F 3/01* (2006.01)
*A63F 13/285* (2014.01)
*F03G 7/06* (2006.01)

(52) U.S. Cl.
CPC ........... *G06F 3/016* (2013.01); *F03G 7/0614* (2021.08); *F03G 7/06143* (2021.08)

(58) Field of Classification Search
None
See application file for complete search history.

(56) References Cited

U.S. PATENT DOCUMENTS

| | | |
|---|---|---|
| 2013/0300880 A1 | 11/2013 | Brown et al. |
| 2016/0320842 A1* | 11/2016 | Saboune ................ G06F 3/041 |
| 2016/0378186 A1 | 12/2016 | Kim |
| 2017/0108931 A1 | 4/2017 | Gregorio et al. |
| 2019/0054373 A1* | 2/2019 | Phan ..................... G06F 3/038 |
| 2020/0334963 A1* | 10/2020 | Yokoyama .............. G08B 6/00 |

FOREIGN PATENT DOCUMENTS

| | | |
|---|---|---|
| CN | 107667330 A | 2/2018 |
| CN | 109597600 A | 4/2019 |
| EP | 3291054 | 3/2018 |
| WO | WO 2012066285 | 5/2012 |
| WO | 2018/048522 A1 | 3/2018 |

OTHER PUBLICATIONS

GB Search Report and Examination Report dated Jul. 1, 2019 of GB Application 1906852.7.
International Search Report and Written Opinion of PCT/GB2020/051203 dated Aug. 25, 2020.

* cited by examiner

*Primary Examiner* — Carl Adams
(74) *Attorney, Agent, or Firm* — Van Hoven PC; Stefan D. Osterbur; Joshua Van Hoven

(57) ABSTRACT

Broadly speaking, embodiments of the present techniques provide techniques for generating haptic feedback or haptic sensations and, in particular, techniques for scheduling such feedback or sensation when there are possibly conflicting requirements for such feedback or sensations.

20 Claims, 9 Drawing Sheets

SCHEDULING HAPTIC FEEDBACK

CROSS-REFERENCE TO RELATED APPLICATIONS

This application is a national stage application under 35 U.S.C. § 371 of International Application PCT/GB2020/051203, filed May 15, 2020, which claims priority of GB Patent Application 1906852.7, filed May 15, 2019. The disclosure of which are hereby incorporated by reference herein in their entireties.

The present application generally relates to techniques for generating haptic feedback or haptic sensations, and in particular to techniques for scheduling outputting haptic feedback in cases where multiple simultaneous or near-simultaneous feedback events are required.

Consumer electronics devices, such as laptops and smartphones, may employ different types of controls to give users of the devices some feedback indicating that they have successfully pressed a button on the device. This is generally known as haptic feedback, and haptic buttons or controls on a device may provide a tactile sensation to the user to confirm that they have successfully pressed the button/control/switch. A haptic button may be provided as a module or assembly for incorporation within an electronic device by a device manufacturer.

The present applicant has identified the need for configurable, customisable haptic feedback, for an improved user experience and for improved operation.

Definitions

The term "haptic profile" is used generally herein to mean a description of a particular type of haptic sensation. In other words, the term "haptic profile" is used herein to mean any description, definition or way of describing/defining a particular haptic sensation that is to be delivered by an apparatus. A haptic profile may be apparatus-agnostic, or may depend on the technical specification of the apparatus or haptic assembly.

A haptic profile may be defined using one or more "primitives". The term "primitive" is used generally herein to mean a base or root value which is used to define a haptic profile, but which itself is not derived from another value.

Haptic feedback may be delivered as part of a pipeline. The term "pipeline" is used generally herein to mean a list or sequence of events or actions.

In a first approach of the present techniques, there is provided an apparatus for delivering haptic feedback comprising: at least one actuator; control circuitry for controlling the at least one actuator; and at least one processor, communicatively coupled to the control circuitry, to: receive an input signal requesting haptic feedback to be delivered; render a haptic profile defining instructions for driving the at least one actuator; generate a haptic drive signal using the rendered haptic profile; and transmit, to the control circuitry, the haptic drive signal to control the at least one actuator to deliver haptic feedback, wherein responsive to receiving an input signal requesting haptic feedback, the at least one processor renders a haptic event pipeline comprising at least one action to be performed, wherein the pipeline is arranged to schedule one or more pulses to be applied to respective one or more actuators and wherein in case of a scheduling conflict, a scheduler applies one or more predefined rules to adjust one or more pulses.

In a second approach of the present techniques, there is provided a method for delivering haptic feedback using at least one actuator, the method comprising: receiving an input signal requesting haptic feedback to be delivered; rendering a haptic profile defining instructions for driving the at least one actuator; generating a haptic drive signal using the rendered haptic profile; and transmitting the haptic drive signal to control the at least one actuator to deliver haptic feedback, wherein responsive to receiving an input signal requesting haptic feedback, the at least one processor renders a haptic event pipeline comprising at least one action to be performed, wherein the pipeline is arranged to schedule one or more pulses to be applied to respective one or more actuators and wherein in case of a scheduling conflict, one or more predefined rules are applied to adjust one or more pulses.

In a third approach of the present techniques, there is provided a control system for use with a device for providing haptic feedback via at least one actuator, the control system being operable to: receive an input signal requesting haptic feedback to be delivered; render a haptic profile defining instructions for driving at least one actuator; generate a haptic drive signal using the rendered haptic profile; and transmit the haptic drive signal so as to control the at least one actuator to deliver haptic feedback, wherein responsive to receiving an input signal requesting haptic feedback, the control system renders a haptic event pipeline comprising at least one action to be performed, wherein the pipeline is arranged to schedule one or more pulses to be applied to at least one actuator and wherein in case of a scheduling conflict, one or more predefined rules are applied to adjust one or more pulses.

In a fourth approach of the present techniques, there is provided is non-transitory data carrier carrying processor control code to implement the method of the second approach.

In the following embodiments, a reference to one or more predefined rules applies equally to each of the aforementioned first to fourth approaches of the present techniques. In other words, the predefined rules apply to all approaches of the present techniques, however embodied.

In an embodiment, the at least one actuator is at least one of: a Shape Memory Alloy, SMA, Actuator; a piezoelectric actuator; an electroactive polymer, EAP, actuator; an electromechanical, EMP, actuator; a linear resonant actuator, LRA; and an eccentric rotating mass, ERM, actuator.

In an embodiment, a scheduling conflict comprises one or more input signals requesting haptic feedback which request a plurality of pulses to be scheduled such that at least part of two or more pulses occur simultaneously.

In an embodiment, one of the one or more predefined rules prioritises a particular pulse according to a defined parameter associated with the particular pulse.

In an embodiment, the parameter associated with the particular pulse includes one or more of: an explicit priority level assigned thereto, a start time, a pulse order or a duration.

In an embodiment, one of the one or more predefined rules prioritises all pulses according to their start time, such that rescheduled pulses are produced in the same order as they are requested, whereby if a pulse is delayed as a result, it follows after the end of the preceding pulse and pulse width is not altered.

In an embodiment, one of the one or more predefined rules prioritises all pulses according to their start time, such that rescheduled pulses are produced in the same order as they are requested, whereby if a pulse is delayed as a result, it follows after the end of the preceding pulse and if a pulse in a particular pulse train is delayed, subsequent pulses in the particular pulse train are delayed by the same amount and pulse width is not altered.

In an embodiment, one of the one or more predefined rules prioritises all pulses according to their start time and a later pulse, if it conflicts with an earlier pulse is either truncated or omitted entirely depending on a duration of the earlier pulse.

In an embodiment, one of the one or more predefined rules adds pulses of one pulse train following a preceding pulse train.

In an embodiment, one of the one or more predefined rules assigns a priority to each of several pulses to be scheduled, such that pulses having a higher priority are scheduled first and pulses having a lower priority are scheduled when the pulses having the higher priority are complete.

In an embodiment, all pulses in a particular pulse train have the same priority.

In an embodiment, one of the one or more predefined rules splits available power between different actuators such that if there is no overlap between pulses in different pulse trains, maximum power is available as requested, and if there is an overlap between pulses in different pulse trains, power is divided between the pulses in the different pulse trains and duration of the pulses is adjusted to maintain requested total energy.

In an embodiment, one of the one or more predefined rules assigns a priority to each of several pulse trains to be scheduled, such that pulses in a pulse train having a higher priority pre-empt pulses in a pulse train having a lower priority, interrupting pulses in the pulse train having a lower priority and whereby a duration of one or more pulses in the pulse train having a lower priority are adjusted to maintain requested total energy.

In an embodiment, available power is time division multiplexed between different possible actuators such that a plurality of slots are defined, with each such slot being associated with a particular actuator.

In an embodiment, power is applied to a particular actuator only during its associated slot.

In an embodiment, the plurality of slots are of equal duration.

In an embodiment, a pulse train associated with each of the different possible actuators has an associated duty, whereby power is provided during a respective slot in accordance with the associated duty.

In an embodiment, the plurality of slots are of unequal duration, defined by a duty of one or more pulses in a pulse train associated with each of the actuators.

In an embodiment, after applying the one or more predefined rules, a check is made to determine if the adjusted one or more pulses are safe to transmit to the actuator.

In an embodiment, if it is determined that it is not safe to transmit the adjusted one or more pulses then: an alternative predefined rule is applied; or one or more of the one or more pulses are modified; or the delivery of haptic feedback is cancelled.

In an embodiment, one or more additional inputs are received as part of the check to determine if the adjusted one or more pulses are safe to transmit to the actuator.

In an embodiment, the one or more additional inputs comprises information relating to the temperature of a given actuator or its immediate vicinity.

In a related approach of the present techniques, there is provided a non-transitory data carrier carrying processor control code to implement any of the methods described herein.

As will be appreciated by one skilled in the art, the present techniques may be embodied as a system, method or computer program product.

Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The apparatus may be any one of: a smartphone, a protective cover or case for a smartphone, a functional cover or case for a smartphone or electronic device, a camera, a foldable smartphone, a foldable tablet computing device, a foldable communications device, a foldable phablet, a foldable image capture device, a foldable smartphone camera, a foldable consumer electronics device, a camera with folded optics, an image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, a phablet, an e-reader (also known as an e-book reader or e-book device), a computing accessory or computing peripheral device (e.g. mouse, keyboard, headphones, earphones, earbuds, etc.), an audio device (e.g. headphones, headset, earphones, etc.), a security system, a gaming system, a gaming accessory (e.g. controller, headset, a wearable controller, joystick, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), an autonomous vehicle (e.g. a driverless car), a vehicle, a tool, a surgical tool, a remote controller (e.g. for a drone or a consumer electronics device), clothing (e.g. a garment, shoes, etc.), a switch, dial or button (e.g. a light switch, a thermostat dial, etc.), a display screen, a touchscreen, a flexible surface, and a wireless communication device (e.g. near-field communication (NFC) device). It will be understood that this is a non-exhaustive list of possible apparatus.

Implementations of the present techniques will now be described, by way of example only, with reference to the accompanying drawings, in which.

Broadly speaking, embodiments of the present techniques provide techniques for generating haptic feedback or haptic sensations and, in particular, techniques for scheduling such feedback or sensation when there are possibly conflicting requirements for such feedback or sensations.

A haptic feedback assembly may be incorporated into any device in which it may be useful to provide a user of the device with haptic feedback. Haptic feedback may be provided to confirm a user action (e.g. to acknowledge a button press), to indicate what action a user is performing (e.g. typing, scrolling, making a selection), or to enhance user experience (e.g. when playing a game or operating an 'app' on a smartphone). For example, haptic feedback assemblies may be incorporated into an electronic device or a consumer electronics device, such as a computer, laptop, portable computing device, smartphone, computer keyboard, gaming system, portable gaming device, gaming equipment/accessory (e.g. controllers, wearable controllers, etc.), medical device, user input device, etc. It will be understood that this is a non-limiting, non-exhaustive list of possible devices. Haptic feedback assemblies may be provided as standalone modules that may be incorporated into an electronic device during manufacture, and may be adapted to suit the device specifications such that it fits into a casing or external surface of the electronic device. Alternatively, some or all of the components of a haptic feedback assembly may be integrally formed in an electronic device. Each haptic feedback assembly may comprise electrical connections, which may couple the assembly to the device's processor(s), chip(s), motherboard, etc. It may be advantageous to use SMA actuator wire in an actuating mechanism that provides haptic feedback because of its high energy density, which means that an actuator comprising SMA actuator wire that is required to apply a particular force can be of a relatively small size. Other forms of actuators may be used, including: a piezoelectric actuator; an electroactive polymer, EAP, actuator; an electromechanical, EMP, actuator; a linear resonant actuator, LRA; and an eccentric rotating mass, ERM, actuator. In the following, reference will be made in particular to SMA actuator wires, but the skilled person will appreciate that one or more different actuators may be used.

Figure 1:
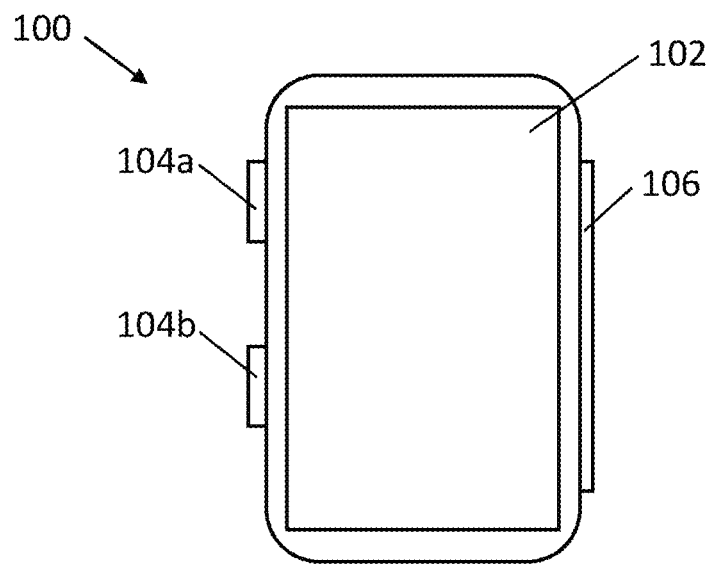
FIG. 1 shows a schematic diagram of an apparatus comprising one or more haptic buttons.

FIG. 1 shows a schematic diagram of an apparatus 100 comprising one or more haptic buttons. The apparatus 100 may be any electronic or electromechanical device. In the Figure, the apparatus 100 resembles a smartphone or tablet computing device, but this is a non-limiting illustration. However, it will be understood that apparatus 100 may be, among other things, a smartphone, a mobile computing device, a laptop, a tablet computing device, a gaming system, a gaming equipment/accessory (e.g. a hand-held controller, wearable controller, etc.), an augmented or virtual reality system, an augmented or virtual reality device, a wearable device, an autonomous vehicle (e.g. a driverless car), or a vehicle (e.g. a car, an aircraft, a spacecraft, a submersible vessel, etc.). The apparatus 100 may comprise a user interface 102, such as, for example, a display screen or a touchscreen.

The apparatus 100 may comprise one or more buttons 104a-b, 106 to receive user input/actions and/or to enable user control of the apparatus. The buttons 104a-b, 106 are shown as protruding along edges of the apparatus 100, but it will be understood that the buttons may be provided anywhere on the apparatus. For example, if the apparatus 100 is a smartphone, one or more buttons may be provided along any edge of the smartphone, on the front face (screen-side) of the smartphone, and/or on the back face of the smartphone. Furthermore, it will be understood that the buttons 104a-b, 106 may not protrude from the apparatus 100, but may be substantially flush with or integrated into a surface of the apparatus. In embodiments, one or more buttons of the apparatus 100 may not be visible to a human user, as the various components of the button (e.g. touch detection mechanism, haptic feedback delivery mechanism, etc. may be located below a surface or edge of the apparatus 100 or integrated into a casing of the apparatus 100. The button may not be pressable—in some cases, the button may be touch-sensitive, such that a force (or a high force) is not required to engage or activate the button. This may be the case if the button is operated using sliding or scrolling gestures.

One or more of the buttons of apparatus 100 may be a haptic button, that is, a button capable of delivering haptic feedback to a user of the apparatus 100. Buttons 104a and 104b are small, discrete buttons on a surface of the apparatus 100, while button 106 is a long button or touch-sensitive area on a surface of the apparatus 100.

If any of buttons 104a-b are haptic buttons, the button may comprise a dedicated haptic assembly for generating localised haptic feedback.

If button 106 is a haptic button, the button may have one or more dedicated haptic assemblies for generating localised haptic feedback. For example, button 106 may have a single haptic assembly provided at a position along the button (e.g. in the centre of the button)—in this case, the haptic feedback may feel the strongest at the point on the button 106 located directly over/above the haptic assembly, and may feel less strong further away from this point. Alternatively, button 106 may have two or more haptic assemblies distributed (equally or otherwise) along the length of the button. In this case, the long button 106 may be used to provide haptic feedback in at least two different ways. For example, the long button 106 may be used to provide haptic feedback using one of the haptic assemblies. The haptic assembly that generates the haptic feedback may be located below or in the vicinity of the point on the button 106 that a user presses/touches, or may be located further away from this point. In another example, the long button 106 may be used by a user to scroll or swipe, and haptic feedback may be provided by each haptic assembly depending on where the user touches/presses the button at a given time. That is, a specific haptic assembly may be activated as the user swipes along the button in the vicinity of the haptic assembly and deactivated when the user swipes along the button further away from that haptic assembly. If the user is swiping along long button 106 to, for example, increase the volume of some audio output, then the 'strength' of the haptic feedback may increase as the user swipes. For example, the 'strength' of the haptic feedback provided by a first haptic assembly (which corresponds to a lower volume selection) may be lower than the 'strength' of the haptic feedback provided by a second haptic assembly (which corresponds to a higher volume selection).

Figure 2:
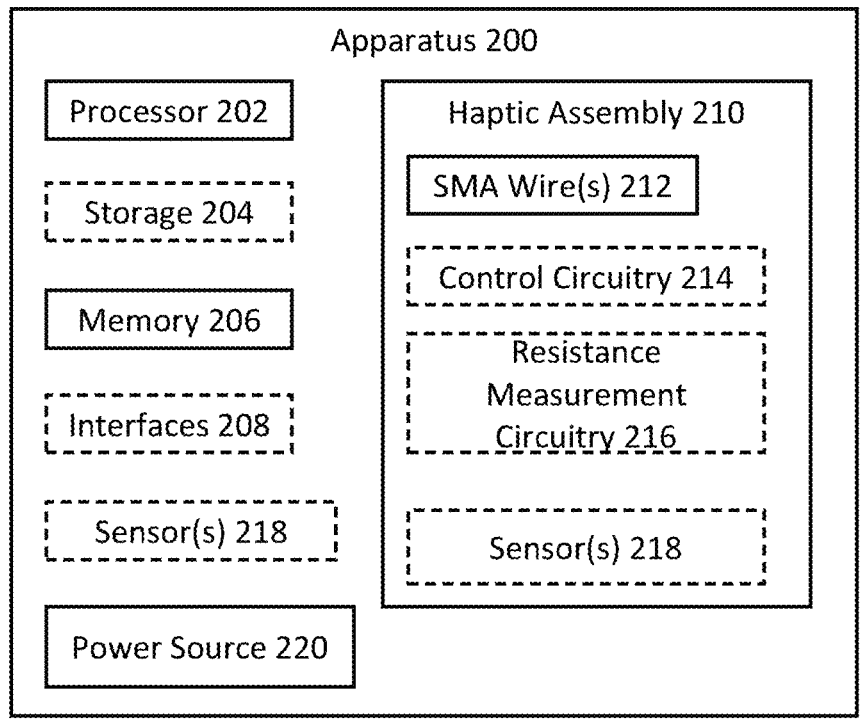
FIG. 2 is a schematic block diagram of an apparatus for delivering haptic feedback, such as the apparatus of FIG. 1.

FIG. 2 is a schematic block diagram of an apparatus 200 that is able to provide haptic feedback, such as the apparatus of FIG. 1. As above, apparatus 200 may be a smartphone, a mobile computing device, a laptop, a tablet computing device, a gaming system, a gaming equipment/accessory (e.g. a hand-held controller, wearable controller, etc.), an augmented or virtual reality system, an augmented or virtual reality device, a wearable device, or a vehicle (e.g. a car, an aircraft, a spacecraft, a submersible vessel, etc.).

The apparatus 200 comprises at least one haptic assembly 210 to generate haptic feedback. As mentioned above, the haptic assembly 210 may not be associated with or comprise a physical button that is visible to a user. In embodiments, the haptic assembly 210 may comprise a piston or button which provides haptic feedback when operated.

In particular embodiments, the or each haptic assembly 210 may comprise a mechanism to move a button of the apparatus in a lateral direction with respect to the contact by the user. Example mechanisms for doing so are described in International Patent Publication WO2018/046937 and United Kingdom Patent Publication No. GB2551657, which are both incorporated herein in their entirety. Additionally or alternatively, the or each haptic assembly 210 may comprise a mechanism to move a button of the apparatus in a direction that is normal to a contact surface of the button (and a surface of the apparatus 200 in which the button is incorporated). Example mechanisms for doing so are described in United Kingdom Patent Application Nos. GB1803084.1 and GB1813008.8, which are both incorporated herein in their entirety.

The or each haptic assembly 210 comprises at least one shape memory alloy (SMA) actuator wire 212.

The or each haptic assembly 210 may optionally comprise control circuitry 214 to control the SMA actuator wire(s) 212. In other words, a dedicated control circuitry 214 may be used to individually control a particular haptic assembly 210 (i.e. one control circuitry 214 controls one haptic assembly 210), or single control circuitry 214 may be used to control multiple haptic assemblies 210 (i.e. one control circuitry 214 controls many haptic assemblies 210). In some embodiments, the control of the SMA actuator wire(s) 212 may be performed using processor(s) 202 or control circuitry which is external to the haptic assembly 210.

In embodiments, as described in United Kingdom Patent Application No. GB1813008.8, haptic assembly 210 may comprise a button capable of moving along a first axis of the assembly and at least one intermediate moveable element in contact with the button. The at least one intermediate moveable element is moveable in a plane defined by the first axis and a second axis, the second axis being perpendicular to the first axis. The at least one intermediate moveable element is arranged to drive movement of the button along the first axis. The haptic assembly 210 may comprise at least one SMA actuator wire coupled to the at least one intermediate moveable element and arranged to, on contraction, move the intermediate moveable element in the plane.

Alternatively, as described in United Kingdom Patent Application No. GB1813008.8, the haptic assembly 210 may comprise a button moveable along a first axis, and at least one intermediate moveable element in contact with the button and rotatable about a second axis that is parallel to the first axis. In this case, the at least one intermediate moveable element is also arranged to drive movement of the button along the first axis. The haptic assembly 210 may comprise at least one SMA actuator wire coupled to the at least one intermediate moveable element and arranged to, on contraction, rotate the intermediate moveable element about the second axis.

It will be understood that these two examples of haptic assemblies are merely illustrative, non-limiting examples, and the techniques for delivering haptic feedback described herein may be used with any type or arrangement of haptic assembly. In both examples, the moveable elements of the haptic assemblies may be provided as physical buttons that a user is able to engage with, or the moveable elements may be 'hidden', e.g. below a surface of the apparatus or below/behind a screen.

The or each haptic assembly 210 may optionally comprise resistance measurement circuitry 216 to measure the resistance of each SMA actuator wire 212 (to e.g. determine a state of the SMA actuator wire). There may be dedicated resistance measurement circuitry 216 to measure the resistance of each SMA actuator wire 212 of an individual haptic assembly 210, or one resistance measurement circuitry 216 for multiple haptic assemblies 210.

The apparatus 200 may comprise at least one processor 202 that is coupled to the or each haptic assembly 210. A single processor 202 may be used to control multiple haptic assemblies 210, or a dedicated processor 202 may be used to control an individual haptic assembly 210. In embodiments, the processor(s) 202 may be used to implement other functions of the apparatus 100. The or each processor 202 may comprise processing logic to process data (e.g. data received from any sensors). The processor(s) 202 may be a microcontroller or microprocessor. The processor(s) 202 may be coupled to at least one memory 206. Memory 206 may comprise working memory, and program memory storing computer program code to implement some or all of the processes described herein to generate haptic feedback. The program memory of memory 206 may be used for buffering data while executing computer program code.

Apparatus 200 may optionally comprise one or more interfaces 208, such as a conventional computer screen/display screen, keyboard (virtual or physical), touch screens/touch sensors, mouse and/or other interfaces such as a network interface and software interfaces. Interfaces 208 may comprise a user interface such as a graphical user interface (GUI), touch screen, microphone, voice/speech recognition interface, physical or virtual buttons. Interaction with the interfaces 208 may be used to generate a command that haptic feedback is to be generated.

Apparatus 200 may optionally comprise a database or storage 204 to store, for example, any data collected by any sensors 218, and/or to store any data that may be used to generate a haptic feedback. For example, storage 204 may store one or more haptic feedback profiles and/or one or more look-up tables that indicate how the haptic feedback profiles may need to be adjusted to take into account environmental factors (e.g. temperature, state of the SMA actuator wire(s), humidity, etc.) Alternatively, such data and look-up table(s) may be stored in memory 206.

Apparatus 200 may optionally comprise at least one sensor 218. The sensor(s) 218 may be provided in the apparatus, and the output of the sensor(s) may be used to control the or each haptic assembly 210. Alternatively, the sensor(s) 218 may be provided in the or each haptic assembly 210. Alternatively, one or more sensors may be provided in the apparatus 200, and one or more sensors may be provided in the or each haptic assembly 210. Wherever sensor 218 is located, the sensor may be a temperature sensor (e.g. a thermistor), a humidity sensor, a touch sensor (e.g. capacitive sensor, force sensor, contact sensor, etc.), an accelerometer, or a gyroscope. In a particular, non-limiting example, a temperature sensor may be provided in apparatus 200, while a force sensor may be provided in the or each haptic assembly 210.

Apparatus 200 may comprise a power source 220, e.g. a battery/rechargeable battery. The power source 220 may be used to power each haptic assembly 210. The power source 220 may also be used to supply power to other components of the apparatus 200, e.g. the processor 202 and interfaces 208. Alternatively, the apparatus 200 may comprise multiple power sources 220.

Figure 3:
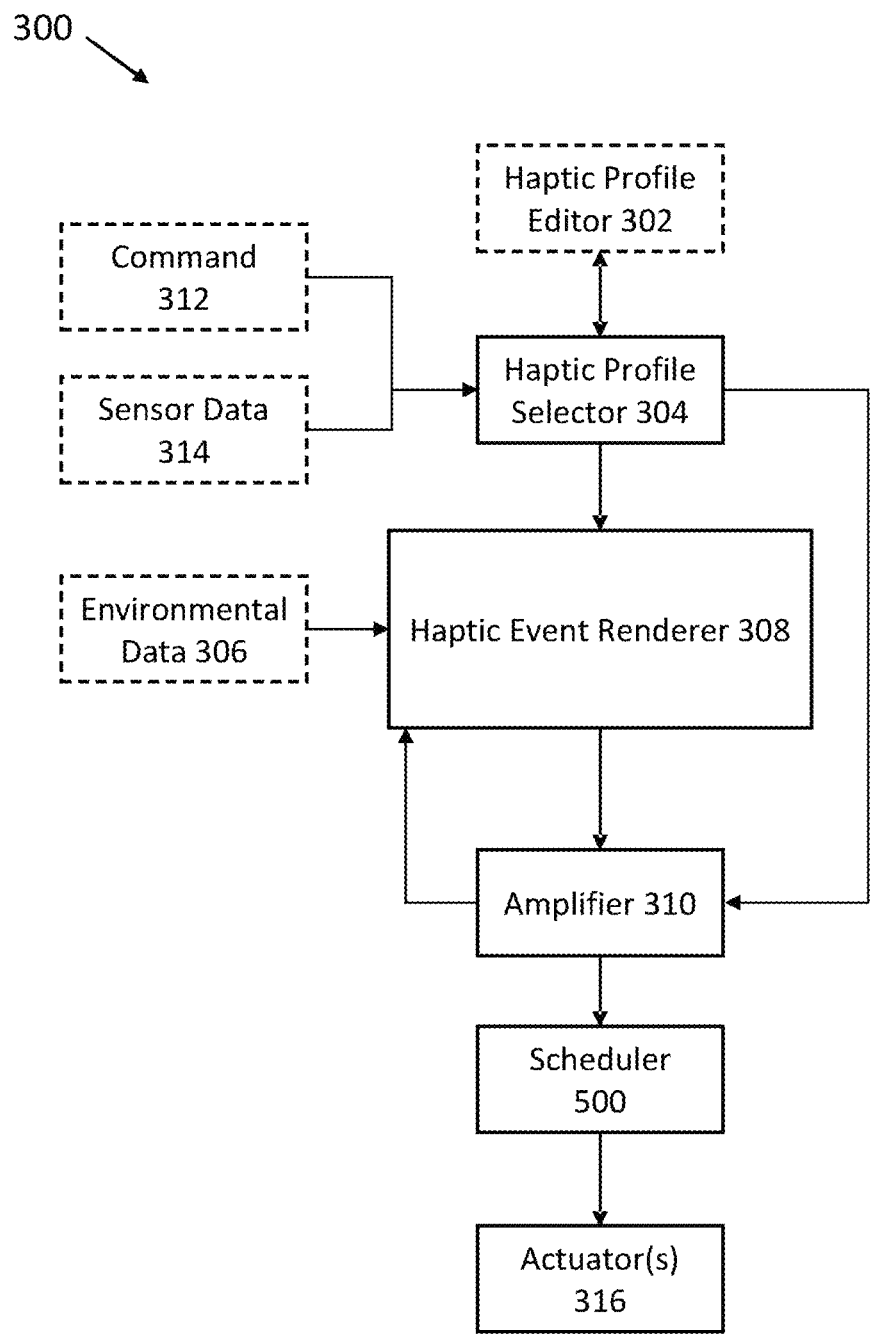
FIG. 3 is a schematic diagram of a system to generate haptic feedback.

FIG. 3 is a schematic diagram of an example system 300 to generate haptic feedback. The system 300 may be considered a haptic feedback rendering system. Generally speaking, the output of a haptic assembly which uses an actuator (e.g. SMA wire(s)) to deliver the haptic sensation may depend on various environmental factors, such as the age of the haptic assembly, number of uses or frequency of use, when it was last used, etc., as well as the technical specification of the haptic assembly (e.g. the diameter of the SMA wires, the number of SMA wires, the resistance of the SMA wires, etc.). The environmental factors and/or technical specification may cause the output haptic sensation delivered by the haptic assembly to differ or deviate from a desired output. (In the following, the term "environmental factors" is used as shorthand to generally mean environmental factors and technical specification). For example, the strength of the haptic sensation may decrease over time due to normal wear-and-tear of the haptic assembly. This may be problematic because the user experience may diminish over time. Another problem with existing haptic feedback systems is that they typically output limited types of haptic sensation. For example, some systems may only output a buzz sensation, regardless of what user action has been performed (e.g. button press, typing, scrolling, selecting, etc.). However, it may be desirable to output different types of haptic sensation such that, for instance, different user actions are associated with different types of haptic sensation. This may enhance the user experience. Similarly, it may be desirable to allow a user to customise the haptic sensation delivered for different types of events or user actions.

In the present techniques, and as mentioned above, a "haptic profile" is a description of a particular type of haptic sensation. Generally, the term "haptic profile" is used herein to mean any description, definition or way of describing/defining a particular haptic sensation that is to be delivered by an apparatus (such as apparatus 100 or 200). In embodiments, the definition or description may be apparatus-agnostic. In other words, the definition/description may not depend on the technical specification of the apparatus or of the haptic assembly used to deliver haptic feedback. In this case, the haptic profile may be modified before it is used to deliver haptic feedback to take into account the technical specification or capabilities of the haptic assembly or apparatus. Alternatively, the definition/description may depend on the technical specification of the apparatus or haptic assembly.

In embodiments of the present techniques, a haptic profile may be defined using one or more "primitives". The term "primitive" is used herein to mean a base or root value which is used to define a haptic profile, but which itself is not derived from another value. One or more of the following primitives may be used to define a haptic profile:

intensity—this primitive value indicates the width of a pulse used to deliver a haptic sensation, or may indicate by how much a haptic button may be displaced/moved to deliver a particular haptic sensation.

More specifically, intensity may be defined as a percentage of pulse duration which would, given a particular power setting, result in the haptic actuator reaching its maximum stroke value. For example, a 5V setting might require a square wave of 8 ms duration to be delivered to reach maximum. In this case, a single pulse at 75% intensity indicates a square wave of 6 ms duration;

number of pulses—this primitive value indicates the number of pulses/instances of motion needed to deliver a particular haptic sensation;

tempo—this primitive value indicates the time between the end of one pulse and the start of the next pulse in a pulse sequence or train;

pitch—this primitive value indicates the power to be applied during a pulse to deliver a particular haptic sensation, where a higher power results in a higher pitch.

Thus, each haptic profile may be defined using one or more of these primitives. In particular embodiments, a haptic profile may be built using the pulse intensity, duration and number of pulses primitives, and the primitive defining the pitch (i.e. power or energy) may be optional. A primitive may be a fixed constant, a variable, or may be defined by a mathematical function. The primitive values are not dependent upon the apparatus or haptic assembly used to deliver haptic feedback. The primitives are described in more detail below with reference to FIG. 4.

In the present techniques, a haptic profile may be selected and used to generate a particular desired haptic sensation. System 300 comprises a haptic profile selector 304 to select a suitable haptic profile for a desired haptic sensation. In embodiments, the haptic profile selector 304 may select a haptic profile from a set of haptic profiles. Alternatively, the haptic profile selector 304 may generate a haptic profile based on one or more primitives that produce the desired haptic sensation. The haptic profile selector 304 may be triggered or initiated based on any type of input or trigger. An example trigger is a command 312. Command 312 may be a command that arises from the implementation of a particular program or application within the apparatus in which the system 300 is provided. Another example trigger is sensor data 314. Sensor data 314 may be received from a button of the apparatus which has been pressed by a user. In other words, a button press may be detected using a force sensor, for example, and the sensed force may trigger the haptic profile selector 304 to select a haptic profile. In embodiments, the magnitude of the force may also be used to select a haptic profile.

Optionally, system 300 may comprise a haptic profile editor 302. The haptic profile editor 302 may enable particular types of haptic event to be generated either in advance of haptic feedback delivery or when haptic feedback has been requested. In embodiments, it may be possible for a user to define the type(s) of haptic feedback or sensation, which may be performed using haptic profile editor 302. The haptic profile editor 302 may be provided as a graphical user interface which allows a user to define a haptic event. In one example, the haptic event may simply be a type of haptic sensation, as defined by a haptic profile. In this case, the user interface of haptic profile editor 302 may enable a user to select the values of one or more primitives. For example, the user interface may comprise slider bars for one or more primitives which the user is allowed to modify or select—the slider bars may allow the user to select a value for a primitive between some minimum and maximum values. In another example, the user interface may comprise drop-down lists of predefined values for one or more primitives—the user may select a value for a primitive from the drop-down list of options. In embodiments, one or more of the primitives may not be modified by a user. For example, it may not be desirable to allow a user to adjust the amount of power of the pulses used to drive the at least one SMA actuator wire of a haptic assembly.

System 300 may comprise a haptic event renderer 308. When a haptic profile 304 has been selected, it may be sent/transmitted to the haptic event renderer 308. The haptic event renderer 308 may be used to generate a haptic drive signal using the received haptic profile. The haptic drive signal is used to control the at least one SMA actuator wire of the haptic assembly to deliver haptic feedback. The haptic event renderer 308 may in embodiments simply generate a drive signal for the SMA actuator wire(s) based only on the haptic profile selected by the haptic profile selector 304. In other embodiments, the haptic event renderer 308 may take into account environmental data or factors 306 as well as the selected haptic profile to generate the drive signal(s). The environmental data 306 may be, for example:

the current temperature in the vicinity of the SMA actuator wire(s), or of the environment outside the apparatus, as measured, estimated or derived;

the state of the SMA actuator wire(s);

the history of the haptic assembly, e.g. the time since it was last used to deliver haptic feedback;

the age of the haptic assembly, e.g. the total number of times it has been used to deliver haptic feedback, or how old the material is (which may give rise to creep);

the orientation and/or position of the apparatus used to deliver haptic feedback;

the resistance value of the SMA actuator wire(s), as measured, estimated or derived;

the humidity in the vicinity of the SMA actuator wire(s) or of the environment outside the apparatus; and the time between presses of a haptic button;

the size of the actuator (i.e. the volume of wire and/or resistance of the SMA actuator wire(s)).

It will be understood that these are just some examples of environmental data 306, and that this list is not an exhaustive list.

The haptic event renderer 308 may modify the haptic profile based on any received or input environmental data 306, in order to generate a drive signal for the SMA actuator wire(s). Some examples are now described.

Temperature: A haptic profile may have been defined for an apparatus that is being used in an environment that is at room temperature (e.g. 21° C.). However, the apparatus may be used in practice in environments having higher or lower temperatures. For example, the apparatus may be used outside during Winter or in countries with colder climates. The haptic assembly, and in particular, the SMA actuator wire(s), may operate differently in cooler/colder temperatures. For example, it may take longer, or may require more power, for an SMA actuator wire to contract at lower temperatures. Thus, the colder temperature may be taken into account by the haptic event renderer 308 to generate a drive signal which allows the same haptic sensation (as defined by the haptic profile) to be delivered. The haptic event renderer 308 may have access to the current temperature to achieve this—the current temperature may be stored in the apparatus, for example. The haptic event renderer 308 may keep aspects of the waveform defined by the haptic profile the same (such as the power (voltage or current), or the duration), but may change other characteristics of the waveform in order for the required haptic sensation to be delivered. Alternatively, the haptic event renderer 308 may adjust power (voltage or current) or duration. Alternatively, the haptic event renderer 308 may adjust the power, duration and/or other characteristics of the waveform. Alternatively, the haptic event renderer 308 may perform an additional action (e.g. pre-heating of the wire) ahead of rendering of the haptic profile.

State of the SMA actuator wire: In some cases, the current state of the SMA actuator wire may make it unsafe to deliver power to the wire. Thus, the haptic event renderer 308 may use the current state of the SMA actuator wire(s) to determine if it is safe to deliver power to the wire, unsafe, or safe to a certain extent. More generally, it is desirable to ensure that a maximum energy is not being exceeded, regardless of the history or current state of the SMA actuator wire, in order to prevent damage to the SMA actuator wire. A haptic profile may specify the energy to be delivered to an SMA actuator wire, but this may be based on some default SMA actuator wire specification (e.g. wire volume). The maximum power deliverable to wires that are thinner than the default SMA actuator wire may be lower, for example. Thus, the haptic event renderer 308 may use information about the SMA actuator wire itself to generate the drive signal for the wire. The haptic event renderer 308 may use a lookup table (which may be populated using experimental and/or model data) to determine whether it is safe to deliver the energy defined in the haptic profile. (In some cases, the safety level may be calculated/determined in real time/on-the-fly and a lookup table may not be used.) The lookup table may, for example, show the safe/allowable energies deliverable to wires at particular temperatures. Thus, the haptic event renderer 308 may generate a drive signal which has a lower energy than that defined by the haptic profile. In some cases, it may not be safe to deliver any energy to the SMA actuator wire, and the haptic event renderer 308 may not generate a drive signal. In this case, the haptic event renderer 308 may truncate a drive signal or pulse which is already being delivered, or omit a pulse of a drive signal, or cancel the drive signal entirely.

History of the haptic assembly: In some cases, the history of the haptic assembly may be used by the haptic event renderer 308 to generate a drive signal. For example, it may be desirable to limit the number of times a haptic button may be actuated in a particular period (e.g. per second or per minute), in order to prevent damage to the haptic button or the SMA wires. In another example, it may be desirable to have a minimum 'rest' period between actuations of the haptic button, or between pulses of a specific haptic sensation, in order to prevent damage to the haptic button or the SMA wires. The haptic event renderer 308 may determine when the last actuation occurred and then generate a drive signal which includes a delay to provide this 'rest' period. Similarly, the haptic event renderer 308 may adjust the time between pulses (as defined by the haptic profile) when generating a drive signal.

The age of the haptic assembly: The total number of times the haptic assembly has been used to deliver haptic feedback may be taken into account by haptic event renderer 308 when generating a drive signal. For example, the operation of one or more components of the haptic assembly may vary over time, such that it may be necessary to use a greater force to achieve the same haptic sensation as the haptic assembly ages. Thus, the haptic event renderer 308 may take into account the age of the haptic assembly (however this may be defined), when generating a drive signal.

The orientation and/or position of the apparatus used to deliver haptic feedback: An accelerometer or gyroscope may be used to determine the orientation and/or position of the apparatus, and the results may be used by the haptic event renderer 308 to generate a drive signal to deliver a particular haptic sensation.

The resistance value of the SMA actuator wire(s): In some cases, the resistance of the SMA actuator wire(s) may be measured or derived and the resistance value may be used by the haptic event renderer 308 when generating a drive signal. For example, a static resistance value may indicate how much power (or how much more power) can be safely applied to an SMA actuator wire. The resistance value may also indicate how much power is required for the SMA actuator wire to contract by an amount required to deliver the haptic sensation. This resistance value is considered to be a static resistance value.

In some cases, the drive signal may comprise driving an SMA actuator wire towards a target resistance value. In this case, a dynamic resistance measurement may be made, to determine if the target resistance has been reached or if the SMA wire needs to be driven further. However, if the maximum allowed/safe power is reached while this driving is taking place, then the haptic assembly may attempt to continually drive the SMA actuator wire regardless of the fact that the target resistance cannot be reached. In this case, the haptic event renderer 308 may adjust the drive signal during use (i.e. during delivery of a haptic sensation) to adjust the target resistance value. For example, the haptic event renderer 308 may aim to deliver a pulse of duration 5 ms, but if in this time, the required target resistance has not been reached, the haptic event renderer 308 may adjust the target and/or the pulse duration. (However, a significant adjustment may cause the haptic sensation to differ from the required haptic sensation. For example, if the pulse duration is lengthened, the haptic sensation may no longer feel like a soft buzz but may feel like a click instead).

Humidity: It may not be desirable to deliver a haptic sensation when the risk of condensation forming inside the haptic assembly is high. This may be the case if the ambient temperature is low, as powering the SMA actuator wire(s) causes the haptic assembly to heat up and may cause condensation to occur, which may cause shorting to occur. (The problem may also occur if the apparatus has been in an environment which is <° 0C and is then taken into an environment which is >° 0C—condensation may occur in this case even when the SMA actuator wire(s) is not powered). The condensation may cause damage to components of the haptic assembly. Thus, the haptic event renderer 308 may not generate a drive signal when the humidity inside the haptic assembly is above some threshold.

Time between presses of a haptic button: The haptic event renderer 308 may not generate a drive signal whenever the haptic profile selector 304 selects a haptic profile (in response to a request for haptic feedback to be delivered). For example, if a haptic button is pressed more than N times in a particular duration D, then the haptic event renderer 308 may ignore the most recent button press (e.g. the most recent selected haptic profile received from the haptic profile selector 304). Thus, in some cases, system 300 may be a frequency-limited system. In embodiments, depending on the haptic profile and information about the previous haptic profile used to deliver haptic feedback recently, the allowable frequency may change.

The system 300 may comprise an amplifier 310. The amplifier 310 may be used to deal with any issues of high instantaneous power and/or the capability of the actuator.

When the drive signal has been generated, it is transmitted to control circuitry and used to control the at least one SMA actuator wire of actuator 316 to deliver haptic feedback.

The system 300 may comprise a scheduler 500. The scheduler is operable to resolve possible timing conflicts in the scheduling of pulses for one or more particular actuators. In particular, it is operable to adjust the timing of one or more pulses in the event that insufficient system resources are available to satisfy all requests fully.

In embodiments, system 300 may be entirely implemented in an apparatus capable of delivering haptic feedback (e.g. apparatus 100, 200). Alternatively, particular functions of the system 300 may be distributed across two or more devices. For example, in embodiments, haptic profile editor 302 may be provided off the apparatus, and the haptic profiles generated there may be uploaded to the apparatus.

Figure 4:
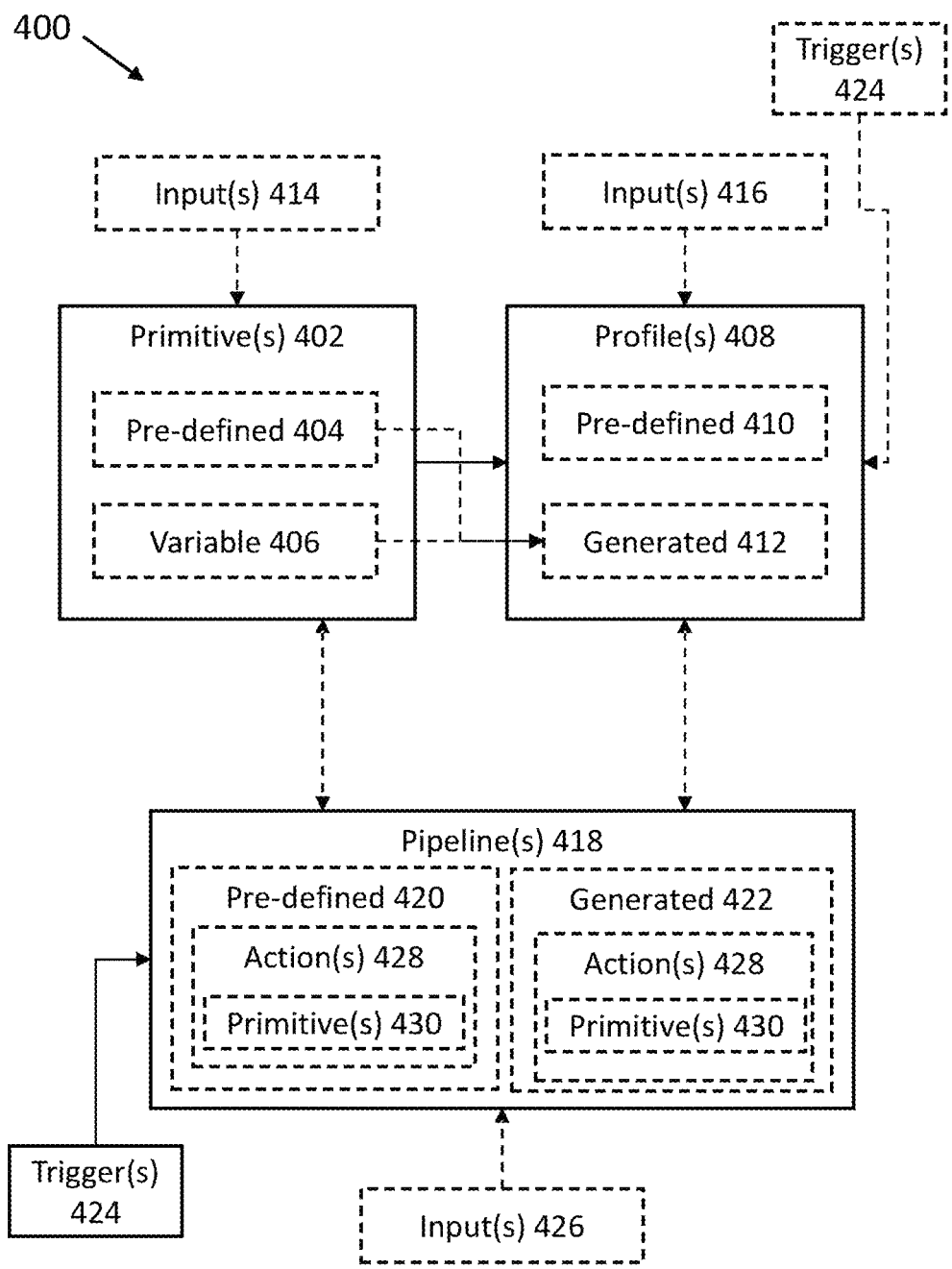
FIG. 4 is a schematic block diagram of a system architecture for generating haptic feedback.

FIG. 4 is a schematic block diagram of a system architecture 400 for generating haptic feedback. As mentioned above, haptic feedback is generated and delivered using haptic profiles 408 and/or primitives 402. Haptic feedback may be delivered as part of a pipeline 418 (see definition above). The system architecture 400 will now be explained in more detail.

When a request for haptic feedback is received (as explained with reference to FIG. 3), a haptic profile 408 may be rendered. The rendered haptic profile defines instructions for driving at least one SMA actuator wire. The haptic profile may be rendered by selecting a profile from a set of pre-defined haptic profiles 410 or may be rendered by generating a generated profile 412 on-the-fly (i.e. during the process to generate and deliver haptic feedback). In embodiments, the rendering process may comprise rendering a haptic profile based only on the received instructions/request to deliver haptic feedback. In embodiments, the rendering process may also comprise taking into account additional information, such as the environmental data 306 described above.

Pre-defined profiles: One or more pre-defined haptic profiles 410 may be stored in the system 400 and accessible by the haptic profile selector 304. The selection may be made based on one or more factors. For example, the selection may be based on:
  which button or haptic button has been pressed;
  why the user has pressed the button (e.g. to make a selection, as part of a game, to change the volume of audio output, to scroll, etc.);
  environmental data;
  the force with which the button/haptic button is pressed;
  a software event; and/or
  a message, trigger or other received communication (e.g. communication or message received from another device or source).

It will be understood that these are just some of the factors that may be used to decide which haptic profile to select from the set of pre-defined haptic profiles 410.

When the haptic event renderer 308 uses a pre-defined haptic profile 410 to generate a drive signal for SMA actuator wire(s), the haptic event renderer 308 may use only the content of the selected pre-defined haptic profile 410 to do so. Alternatively, the haptic event renderer 308 may use one or more inputs 416 (e.g. environmental data), in combination with the selected pre-defined haptic profile 410, to generate a drive signal. This may comprise modifying aspects of the selected pre-defined haptic profile 410.

Generated profiles: The haptic event renderer 308 may generate a generated haptic profile 412 based on the received instructions/request for haptic feedback. The haptic event renderer 308 may in some cases only use the received instructions to generate the generated haptic profile 412. Alternatively, the haptic event renderer 308 may use one or more inputs 416 (e.g. environmental data), in combination with the received instructions/request, to generate a drive signal. In each case, the haptic event renderer 308 uses one or more primitives 402 to build the generated profile 412. The primitives 402 may be pre-defined primitives 404 or variable primitives 406, or a combination of the two.

As explained above, a haptic profile may be defined using one or more primitives. System 400 may contain a store of one or more pre-defined primitives 404. The pre-defined primitives 404 may be fixed constants. One or more primitives may be variable primitives 406. The variable primitives 406 may vary depending on one or more inputs 414 (e.g. environmental data). The pre-defined primitives 404 and variable primitives 406 may include one or more of the above described primitives, i.e. intensity, number of pulses, tempo and pitch. In embodiments, it may be desirable to prevent a primitive from changing. For example, it may not be desirable to change the pitch because doing so may cause damage to the system.

Thus, the generated haptic profile 412 could be built using pre-defined or fixed primitives 402 and/or variable primitives 406.

Haptic feedback may be delivered as part of a pipeline and therefore, system 400 may comprise one or more pipelines 418, or at least the capability to construct a pipeline. The term "pipeline" is used herein to mean a list or sequence of events or actions. The events/actions may need to take place in a specific order, and the order may be defined in a pipeline. For example, a pipeline may specify a series of events A, B and C, and may specify that A must take place before B, and B must take place from C. In addition to the events/actions, a pipeline may contain conditional statements. The conditional statements may be 'if this then that' (IFTTT) type statements or 'if else' type statements. For example, a pipeline may specify "if X, then action A must take place, or if Y, then ignore action A and start with action B", where X and Y are particular conditions. The conditions may be, for example, the value of some environmental data (e.g. the current temperature, resistance value of the SMA wire(s), etc.). Additionally or alternatively, the conditions may be based on other programs, software, applications or actions being taken or run on the apparatus on which the haptic feedback is going to be delivered. For example, the condition may be whether or not audio is being output from the apparatus.

A pipeline 418 may be a pre-defined pipeline 420, or may be a generated pipeline 422 that is generated on-the-fly (e.g. as part of the process to deliver haptic feedback). Each pre-defined pipeline 420 and each generated pipeline 422 comprises at least one action 428. The action(s) 428 may be commands or may be associated with commands for implementing the action 428. For example, if an action 428 is to "output audio", the action 428 may be associated with commands, instructions or scripts to implement the action. (For example, the action may raise a trigger within the apparatus and the apparatus may then, for example, check a memory location to determine what action to perform (e.g. play audio)). Similarly, if an action 428 is to "deliver haptic feedback", the action 428 may be associated with instructions outlining where a drive signal needs to be sent in order for haptic feedback to be delivered (e.g. to each SMA actuator wire or to a particular SMA actuator wire, or to control circuitry used to control the haptic assembly, etc.).

In embodiments, the pre-defined pipeline 420 and/or generated pipeline 422 may comprise one or more primitives 430. The primitives may be pre-defined and/or variable primitives, as described above. The primitives 430 may be provided as a type of action 428. For example, if a pipeline specifies a sequence of actions 428 A, B, C and D, then action A may be a primitive or set of primitives 430 (or an action to fetch one or more primitives from memory), action B may be a command to build a haptic profile using action A, action C may be to generate a drive signal using the haptic profile, and action D may be to apply the drive signal to deliver haptic feedback. More generally, each action 428 may be associated with commands, scripts or other instructions on how to implement the action 428 or how to complete the step associated with action 428. The primitive 430 may, in some cases, simply be or comprise a pointer to the location of the primitive value itself. That is, primitive 430 may be a pointer to the location in memory of the primitive value.

A trigger 424 may trigger the initiation of a pipeline 418. Trigger 424 may be instructions or an input signal requesting haptic feedback to be delivered. The trigger 424 may initiate the selection of a pre-defined pipeline 420, or may cause the generation of a generated pipeline 422. Optionally, one or more inputs 426 (e.g. environmental data) may also be used to select a pipeline or to generate a pipeline. The input(s) 426 may be used to modify a selected pre-defined pipeline 420. Regardless of whether it is pre-defined, modified, or generated, the pipeline comprises one or more actions 428, where an action 428 may be a primitive 430. The primitive(s) 430 may be a fixed/pre-defined primitive, or may be a variable primitive which may vary depending on one or more inputs 426.

Regardless of whether it is pre-defined or generated, one of the actions 428 of a pipeline 418 may be to select or build a haptic profile 408. A haptic profile may be selected from the set of pre-defined haptic profiles 410, using the information in the trigger 424 and/or input(s) 426. Alternatively, a haptic profile may be generated 412, using the information in the trigger 424 and/or input(s) 426. The selected pre-defined haptic profile 410 may be modified, or the generated profile 412 may be built, using one or more inputs 416

Thus, in the simplest case, every aspect of the system is pre-defined. In this case, a trigger may cause a pre-defined pipeline 420 to be initiated, where all the actions 428 of the pipeline are defined, as are the haptic profile(s) 408 and primitives 402 the pipeline may rely upon. A more complicated case is where every aspect of the system is generated on-the-fly. In this case, a trigger may cause a pipeline to be generated 422, and the haptic profile(s) 408 and primitives 402 that the pipeline needs to use are also generated or varied/modified on-the-fly. It will be appreciated that a large number of possibilities exist between these simple and complex cases.

In particular embodiments, the pipeline 418 may be optional. For example, if a pipeline 418 only contained an action 428 to deliver haptic feedback using a pre-defined haptic profile 410, then the pipeline may not be necessary. In this case, trigger 424 may directly initiate the selection of the pre-defined haptic profile 410.

The present techniques aim to deliver haptic feedback using the system architecture described with reference to FIG. 4.

If more than one haptic feedback event is required simultaneously or near simultaneously, such that different haptic events may collide, certain issues may arise in delivering such events. This is herein referred to as a scheduling conflict and it occurs when at least two pulses are requested such that at least part of the at least two pulses occur simultaneously.

One issue arises due to the typically limited instantaneous power available to deliver haptic feedback. This is particularly true in devices such as smartphones, wearables, cameras and the like, which have a finite and often limited power supply available. In order to optimise the power performance of the device in question, a single power supply may be provided to provide power to a plurality of haptic actuators, each associated with a haptic button or part of the device. As such, it may not be possible to drive all haptic actuators at any given time. A system may comprise e.g. three actuators but only two may be driven simultaneously.

Another issue relates to available hardware resources in a system, such as that illustrated in FIG. 4. Typically, pulses are hardware controlled using, for instance, a 16 or 32-bit timer provided in an integrated circuit, IC. Such an IC has a finite number of pins or connections available and so may not be able to control the delivery of haptic feedback to all available actuators simultaneously. As such, the total available energy which may be delivered may be implicitly limited by the available hardware resources. In addition, there may be other hardware limitations which can affect the creation and delivery of pulses.

It is therefore desirable to define a scheme whereby requests for providing haptic feedback to different actuators are processed and scheduled in a way which respects the requests and complies with the constraints of the physical arrangement of the device.

Embodiments of the present techniques should aim to address issues with limited power supply and/or hardware and the relative timing constraints of individual pulses in a single pulse train associated with a particular actuator.

In general, practical embodiments of the present invention may require the sharing of some hardware resources, which places limitations on the ability to independently create pulses for haptic feedback for different haptic actuators. This may be due to the requirement to share one or more power supplies, timers, I/O pins, scheduler or other resource.

As such, one or more schedulers is provided. Each scheduler is implemented in two stages: a wait stage; and a preload stage. The wait stage is typically implemented in firmware and this is where individual pulses and pulse trains are ordered and prioritised. The preload stage is typically implemented in hardware and this is where pulses are loaded, typically 1 ms before their start time. This ensures that the pulses can be programmed with a suitable precision, in terms of delay and width.

Figure 5:
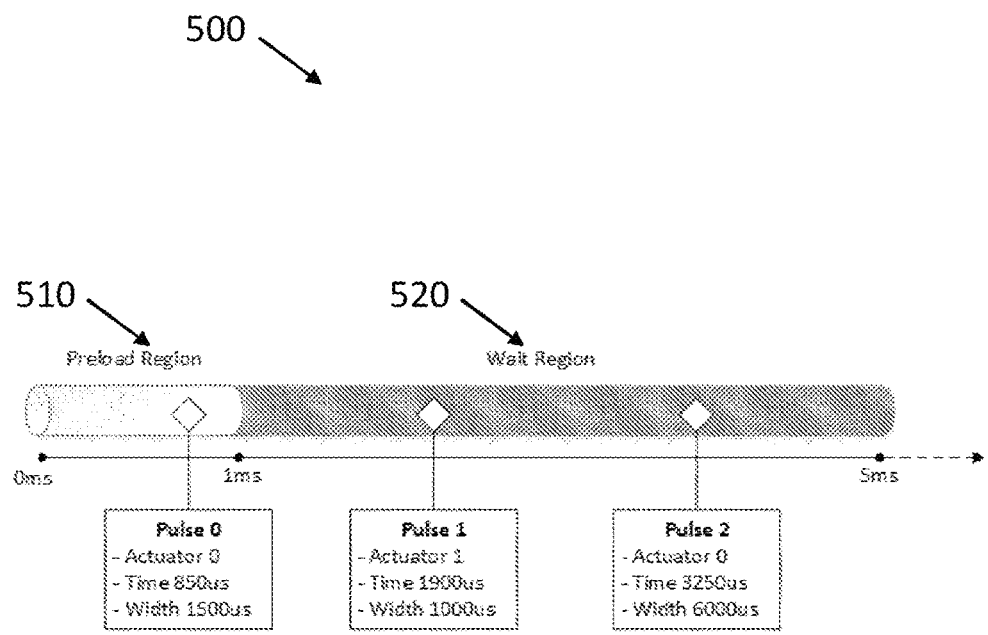
FIG. 5 is an illustration of a scheduler comprising a preload and a wait region.

The scheduler 500 referred to is illustrated in FIG. 5. The preload region 510 immediately precedes the wait region 520. Sample pulses (pulses 0, 1 and 2) are shown at various stages in the scheduler 500.

Pulse trains, comprising one or more pulses, are initially loaded in the wait region 520 which is where pulses are ordered and prioritised. When a new pulse train is added to a non-empty scheduler, the scheduler must solve potential conflicts by re-arranging the pulses using a strategy or scheme. Several schemes are presented below. One or more may be implemented as required.

In the following, a pulse train is intended to refer to a string of one or more individual pulses. Each pulse is generally a square pulse i.e. one having sharp rising and falling edges. However, other pulses, including those with a more sinusoidal, triangular or other shape may be used as required.

In the foregoing, reference has been made to profiles and it is desirable to understand the inter-relation between a profile and a pulse train. The pipeline referred to previously can include one or more profiles and an output from the pipeline is a pulse train. In a simple case, therefore, a profile and a pulse train can be synonymous, but a pulse train may comprise multiple profiles.

In certain contexts in the following, a single pulse may include further pulses where the context demands. For instance, a pulse may be defined in terms of a start time and a duration. If a further parameter, duty, is defined as well, then the pulse may be switched within its overall duration, according to the defined duty, so as to effectively decrease the energy of the pulse without altering its duration.

As an alternative to the use of switching the pulse within its overall duration, which may in some circumstances be less desirable, due to the presence of possible high frequency switching noise, the energy of a pulse may be adjusted by means of linear drive, which is able to adjust the amplitude of an output pulse.

In a first scheme, the following rules apply:
Pulses are prioritised according to their start time;
When there is a conflict between two pulses, the second pulse is delayed until the end of the first pulse; and
Width of pulses is never changed The first scheme is simple to implement in that the rules are clear. In this case, the energy of individual pulses is not altered. However, it can create a burst or concentration of energy on a single actuator. This can be undesirable, since each actuator is typically specified to receive a certain maximum energy input in a given time. If an amount of energy is applied which is at or near this maximum, then the actuator may not function correctly or may even be damaged. Furthermore, the relative timing of pulses in the same pulse train can be altered by application of the rules.

Figure 6:
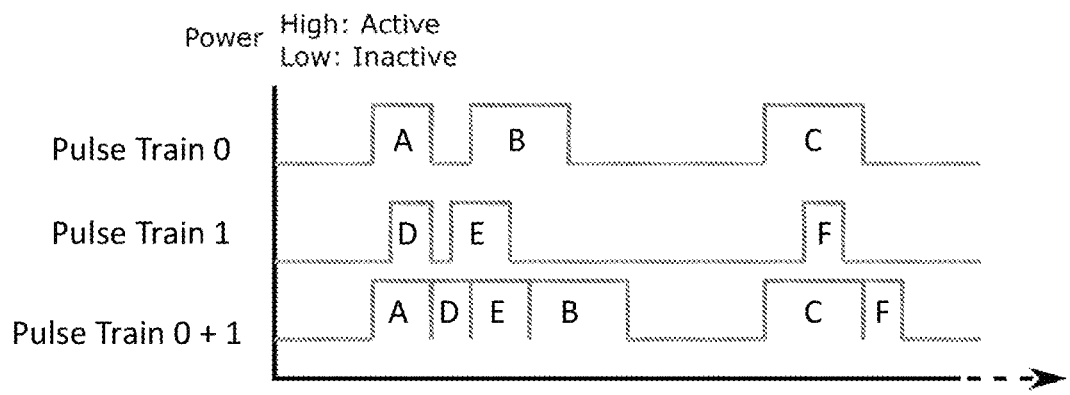
FIG. 6 shows a timing diagram illustrating scheduling of haptic feedback pulses.

FIG. 6 shows the application of the first strategy on two desired pulse trains (pulse train 0 and pulse train 1). Pulse train 0 comprises pulses A, B and C. Pulse train 1 comprises pulses D, E and F. In this scenario, pulse trains 0 and 1 are produced using a common power supply, which shares a common scheduler 500.

By applying the rules of the first scheme, the start time is prioritised and the combined drive output (pulse trains 0+1) is shown. In this way, for instance, pulse D follows pulse A and pulse E follows pulse D, meaning that the pulses appear in the drive output in the same order as requested, and the resultant pulses are of the same length as requested. However, as mentioned previously, energy can be concentrated in an undesirable manner by means of this scheme and so care is required. By examining FIG. 6, pulses D and E are requested with a short time between them, but by application of the rules of this scheme, they actually appear in the output with no or little time between them.

In a second scheme, these rules apply:
Pulses are prioritised according to their start time;
When there is a conflict between two pulses, the second pulse is delayed until the end of the first pulse;
When a pulse is delayed, subsequent pulses of the same pulse train are delayed by the same duration; and
Width of pulses is never changed In the second scheme, the energy of individual pulses is not altered and there is no burst of energy on a single actuator. The relative timing of pulses within the same pulse train can be altered.

Figure 7:
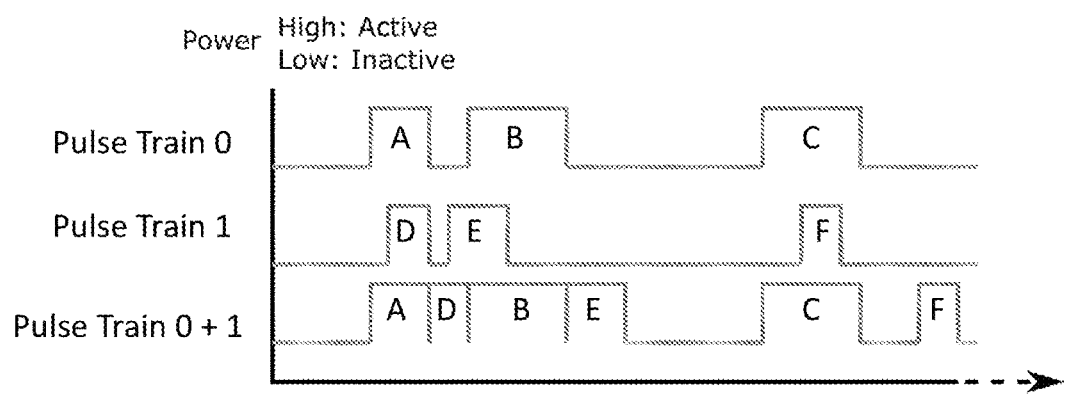
FIG. 7 shows a timing diagram illustrating scheduling of haptic feedback pulses.

The effects of applying the second scheme is illustrated in FIG. 7, which shows the same pulse train 0 and pulse train 1 as in FIG. 6, whereas the resultant pulse train 0+1 is different due to the application of the second scheme.

Now, the individual pulses are initially sorted according to their start times, but in the case of conflict, the second pulse is delayed until the end of the first pulse. This alters the relative sequencing of pulses A, D, B and E compared to the first scheme, since pulses B and E are now swapped in order. In this scheme, the total time to output all pulses A to F is increased when compared to the first scheme of FIG. 6. Also, by application of this scheme pulses D and E are separated in time, avoiding the risk of excess energy in that particular actuator.

Further, pulse F is delayed by the same amount as pulse E.

In a third scheme, these rules apply:
Pulses are prioritised according to their start time; and
When there is a conflict between two pulses, the width of the second pulse is truncated to fit or removed entirely.

In this scheme, the energy of individual pulses can be altered, by virtue of truncation or deletion. There is no burst of energy on a single actuator.

Figure 8:
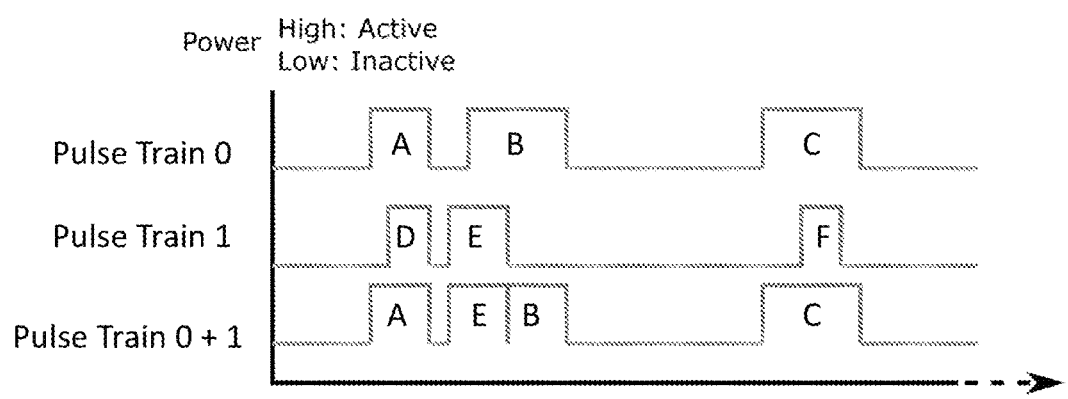
FIG. 8 shows a timing diagram illustrating scheduling of haptic feedback pulses.

The effects of applying the third scheme is illustrated in FIG. 8, which shows the same pulse train 0 and pulse train 1 as in FIG. 6, whereas the resultant pulse train 0+1 is different due to the application of the third scheme.

Here, it can be seen that by application of the third scheme, pulse D has been omitted and pulse B has been truncated since it conflicts with pulse E. Similarly, pulse F has been omitted, since it conflicts with pulse C.

In a fourth scheme, this single rule applies:
Any pulses contained within a pulse train remain unchanged and any new pulse train is added to the end of the current pulse train.

In this scheme, the energy of individual pulses is not altered. There is no burst of energy on a single actuator and the relative timing of pulses in the same pulse train is not altered. However, there can be greater delays for some pulses or pulse trains.

Figure 9:
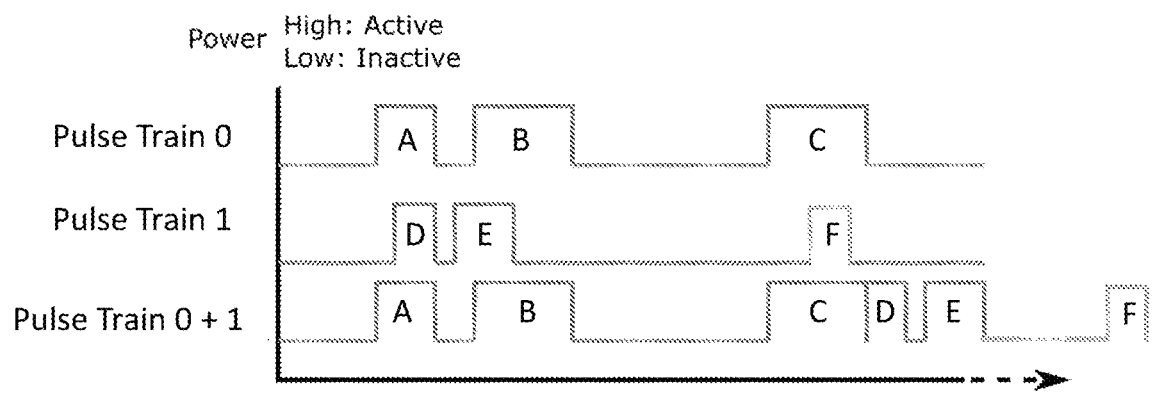
FIG. 9 shows a timing diagram illustrating scheduling of haptic feedback pulses.

The application of the fourth scheme is illustrated in FIG. 9, which shows the same pulse train 0 and pulse train 1 as in FIG. 6, whereas the resultant pulse train 0+1 is different due to the application of the fourth scheme. Note that the time gap between pulses E and F in the output pulse train 0+1 is the same as the time gap in the input pulse train 1.

Here, pulse train 1 is simply added after the generation of pulse train 0.

It can be seen that by selecting one of the schemes (1-4) set out above, different effects can be achieved and one or more of the schemes can be implemented in any given device, depending on the particular requirements. The particular requirements may be based, for instance, on a desired user experience.

For instance, it may be particularly important for one particular haptic feedback experience to be preserved, if several haptic feedback events are scheduled and require amending by one or more of the schemes above. As an example, a sharp single haptic pulse of relatively short duration may be required at one actuator, while a relatively longer "gentle buzz" feedback may be required at another. If there are insufficient resources to render both events simultaneously, then a scheme as set out above is used. In order to determine which scheme to use, it may be considered that the single sharp haptic pulse takes priority over the buzz or vice-versa. This may inform the decision as to which of the schemes is selected. The decision may take into account e.g.

whether it is more important to preserve the overall duration of one of more haptic events, the relative order of different events or whether a particular event can tolerate a reduction in energy.

Referring back to FIG. 5, note that individual pulses are preloaded moments before their actual due time using one or more high precision timers, configured in one-pulse mode. A typical preload time is 1 ms. This ensures that pulses are always preloaded before their actual start time.

The preload time can depend on factors such as the rate of service of the haptics application in the firmware and other hardware limitations. For instance a 16-bit timer operable in microsecond increments limits the total (delay+width) to 2^16 microseconds=65.536 ms.

Generation of pulses can be implemented using 16-bit timers with microseconds precision configured in one-pulse mode, where a single pulse is generated once triggered. There should be at least one timer per scheduler, but there can be up to 1 timer per actuator.

Figure 10:
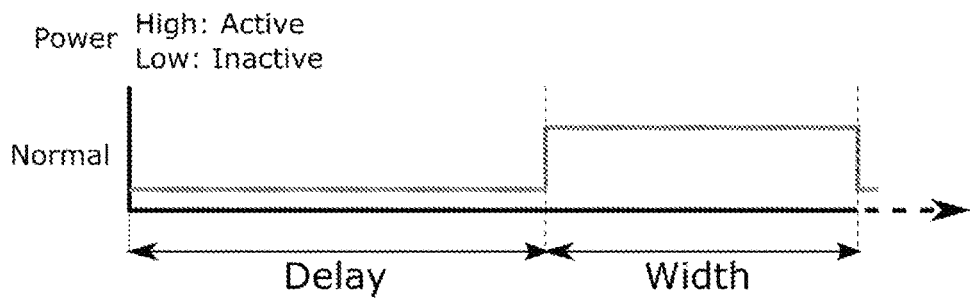
FIG. 10 illustrates the operation of a 1-stage timer associated with the generation of haptic feedback.

A typical timer configured in one-pulse-mode is used to generate the pulse with the desired timing:
The timer starts at 0 in counting-up mode
The compare register is loaded with the delay of the pulse
The period or reload register is set to the delay+width of the pulse
When a compare match event is generated the selected output is set to active state
When a reload event is generated the selected output is set to inactive state and the timer is stopped This is shown in FIG. 10, where the delay period is followed immediately by the pulse of width as defined above. Such an arrangement is able to generate sub-microsecond precision for the pulse width and also minimises jitter for the ON edge of the pulse. In general, it is desirable to minimise jitter so that a desired timing accuracy can be achieved. Any timing derived from a hardware counter is likely to be more accurate than that derived from firmware or software and so this should be taken account of in the system design.

An alternative technique uses pulse width modulation (PWM) to modulate pulses and control the power applied to the SMA wires without changing the relative timing of the pulses.

Figure 11:
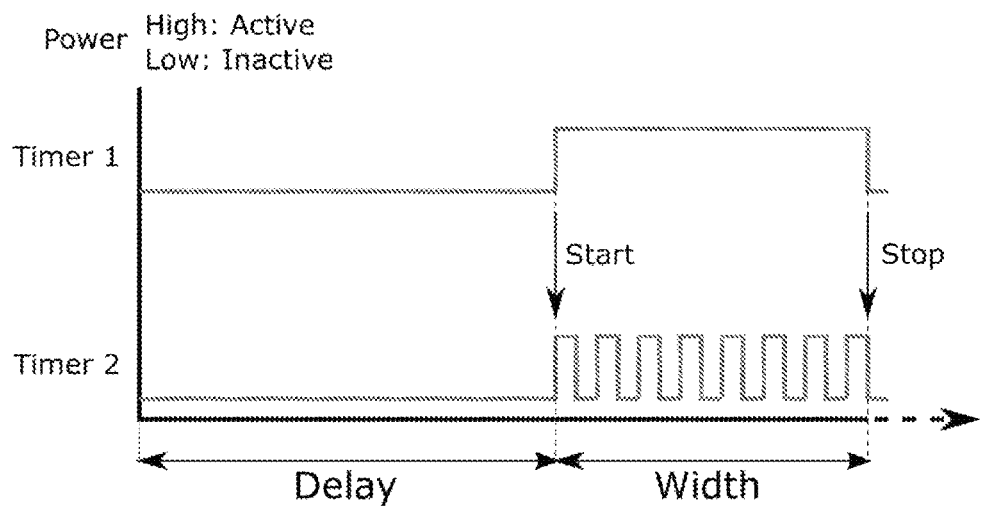
FIG. 11 illustrates the operation of a 2-stage timer associated with the generation of haptic feedback.

This can be implemented using a second timer in addition to the simple timer referred to above In this PWM implementation, the configuration of the first timer is as set out above. However, instead of the output driving the SMA wire directly, it is used to enable a second timer. The second timer is operable in PWM mode, where the duty is set according to the power which is to be applied to the SMA wire. In other words, the overall power applied to the wire is reduced if the off time is increased compared to the on time of the pulses in the "width" portion of the pulse shown in FIG. 11.

If this PWM implementation is combined with one of the schemes set out above, it allows a finer control of power in any particular pulse, since the overall power can now be fine tuned by means of the duty of a particular pulse. This is one of the contexts referred to previously where a pulse may be considered to further comprise a plurality of pulses. By reference to FIG. 11, the pulse defined as "width" whose duration is defined by the different between the start and stop times shown, includes a plurality of other pulses. These other pulses are controlled by the particular PWM configuration and can be used to control the energy in the pulse of duration "width".

The linear drive technique referred to previously may be used in conjunction with any of the aforementioned schemes, in place of PWM, to allow a finer control of power or pulse energy. It should be noted that if linear drive is used, then a scheduling conflict only occurs in the event that total requested power exceeds 100% of the available power supply.

A further embodiment uses a system of priorities attached to particular pulse train or pulses, whereby their relative importance is reflected in a priority classification, depending on their relative importance in providing haptic feedback to a user.

Figure 12:
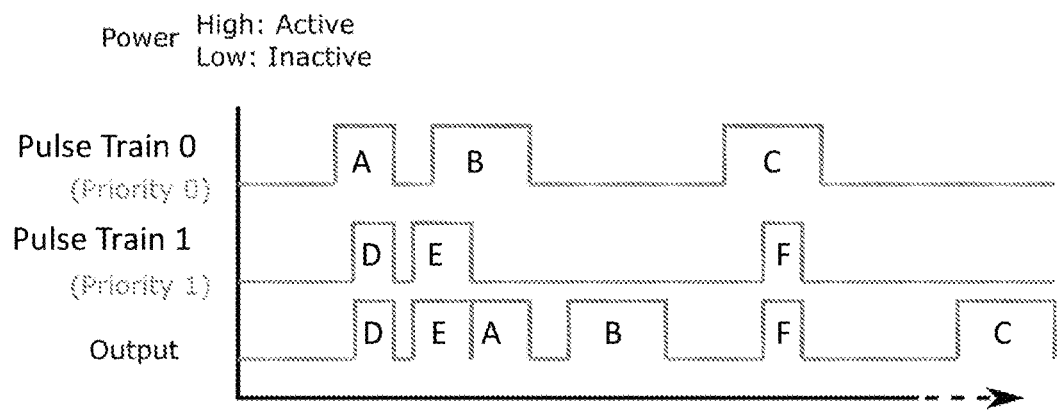
FIG. 12 shows a timing diagram illustrating scheduling of haptic feedback pulses.

In this embodiment, illustrated in FIG. 12, each pulse train is associated with a priority level. In the case of a scheduling conflict, the pulse train with the lower priority is re-scheduled in preference to the pulse train with a higher priority.

In the event of re-scheduling, the lower priority pulses are re-scheduled using one or more of the schemes which have been set out in relation to the embodiments shown in FIGS. 6 to 9.

FIG. 12 shows Pulse train 0 and Pulse train 1. Pulse train 1 has a higher priority and so takes precedence over Pulse train 0. As such, pulses D and E are output and pulses A and B are delayed until D and E are complete. Similarly, pulse C is delayed until after pulse F and is delayed by the same time pulse A is delayed. This maintains the relative timing between pulses D and F.

In effect, FIG. 12 uses the same re-ordering scheme as that shown in FIG. 7 but uses priority level rather than start time as the prime consideration when re-scheduling pulses in a pulse train.

This embodiment can be further refined by defining classes for particular pulses or pulse trains. Here, each pulse or pulse train is associated with one or more predefined classes. If multiple pulse trains are added to the scheduler, it examines the classes of each to determine which rules may be used to resolve conflicts. The class can define which rules from the available scheduling schemes can be used to resolve such conflicts.

The classes can be defined in such a way that important features of particular pulses or pulse trains are identified and prioritised. For instance, one class may specify that the associated pulse train should/can be delayed when resolving conflicts. Another class may specify that the energy (i.e. the width of pulses) of the pulse train can be reduced when resolving conflicts. A still further class may specify that the pulse train should not be altered at all.

Other class definitions are possible according to the particular requirements of any particular system.

The embodiment of FIG. 12 explicitly applies different priorities to different pulse trains, whereas the embodiments of FIGS. 6 to 9 prioritise certain pulses within a pulse train on the basis of the rules associated with each of the schemes therein disclosed. At a more general level, it can be seen that certain pulses (or pulse trains) may be prioritised on the basis of e.g. an explicit priority level assigned thereto, a start time, a pulse order, a duration, or any other parameter associated with a particular pulse or pulse train.

A further embodiment provides a means to drive two actuators simultaneously, with an instantaneous reduction in the energy supplied to a given actuator, whereby the width of individual pulses is adjusted to ensure that the total energy delivered by the particular pulse remains the same. In effect, the "area under curve" which equates to pulse energy is preserved as far as possible, such that an instantaneous reduction in amplitude of a given pulse requires an extension in duration.

Figure 13:
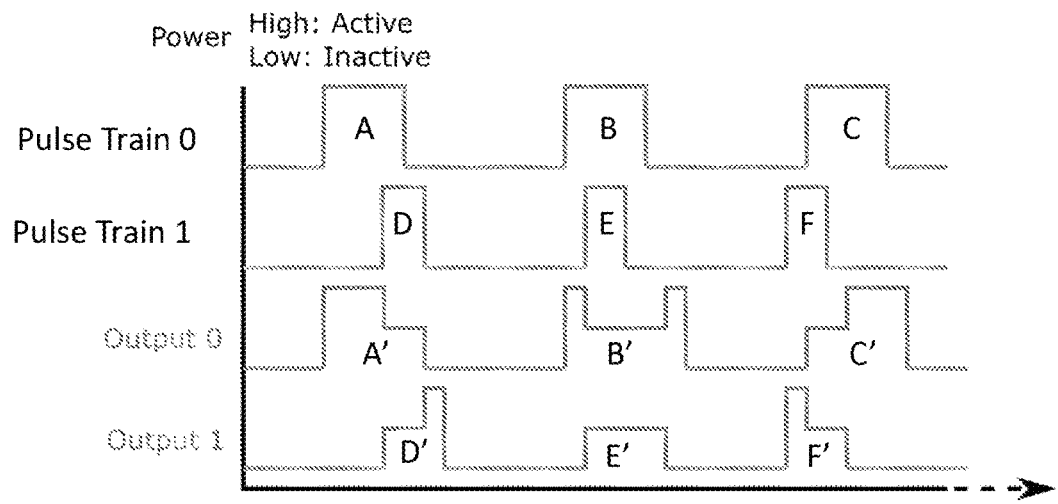
FIG. 13 shows a timing diagram illustrating scheduling of haptic feedback pulses.

This is illustrated in FIG. 13, which shows Pulse train 0 and Pulse train 1. As can be seen in the two upper traces, there is some conflict between pulses in each pulse train. The lower two traces show the respective outputs to Actuator 0 and Actuator 1.

In this case, considering pulses A and D, for the period when either of these pulses does not collide with the other, the power delivered to the respective actuator is maximised. However, for the time period when the two pulses collide in time, each one is provided with half the maximum power available. This is illustrated in form of pulses A' and D', where the power available is reduced when power is simultaneously provided to the other pulse. Similar constraints apply to the other pulses illustrated. In this example, pulses are not rescheduled per se. Rather, they are extended, if necessary, to ensure that the same amount of energy is applied by a pulse, even if there is a conflict. Note that, for instance A' is wider than A, but represents the same total pulse energy.

Whilst illustrated with two competing pulse trains, it will be appreciated that this technique may be applied in cases with a greater number of possibly conflicting pulses. In such a case, rather than providing each pulse with half of the maximum power available, each pulse may be provided with a certain fraction of the total power available. In the simplest case, with n competing pulses, the total power applied to each pulse can be 1/n of the total power available. However, this 1/n rule can be adapted so that there is not a uniform split between the n pulses.

Advantageously, this embodiment is able to preserve the relative start timing of the individual pulses, even if the duration of individual pulses is changed. Overall energy applied to each pulse is preserved, but instantaneous power may be reduced which may result in the haptic pulses feeling less sharp or defined.

In a further embodiment, when some pulse trains or actuators have a higher priority, they are able to pre-empt pulse trains or pulses of lower priority which are in the scheduler. In such a case, it is desirable that the scheduler adjusts the duration of the lower priority pulse such that it still delivers the required energy overall.

Figure 14:
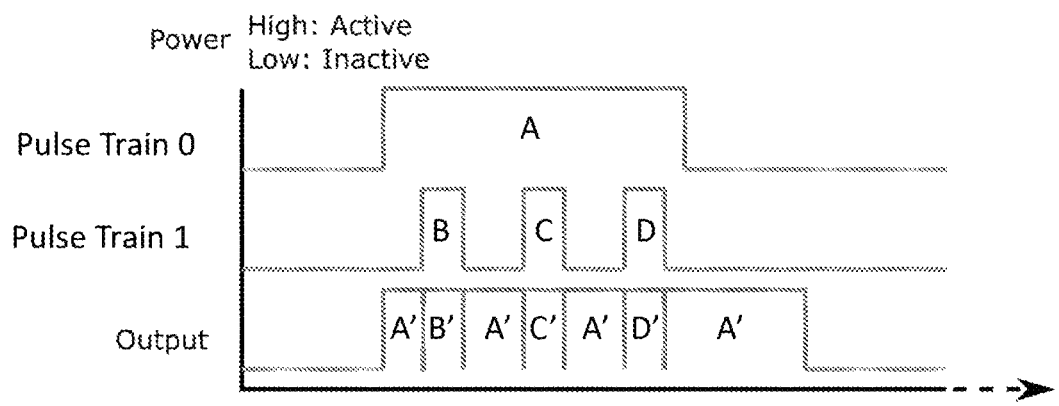
FIG. 14 shows a timing diagram illustrating scheduling of haptic feedback pulses.

This is illustrated in FIG. 14, which shows two pulse trains, Pulse train 0 and Pulse train 1. Pulse train 1 is higher priority and so its pulses B, C and D pre-empt the pulse A in the output and appear as B', C' and D' at the requested time positions. Pulse A is effectively separated into several sub-pulses A' in the output, interrupted by B', C' and D'. The overall total duration of the sub-pulses A' is the same as pulse A in the original pulse train.

In this embodiment, the overall energy and relative timing of the pulses is preserved, but the lower priority pulses may appear less sharp or defined during periods of overlap, since the instantaneous power is reduced for these pulses.

Figure 15:
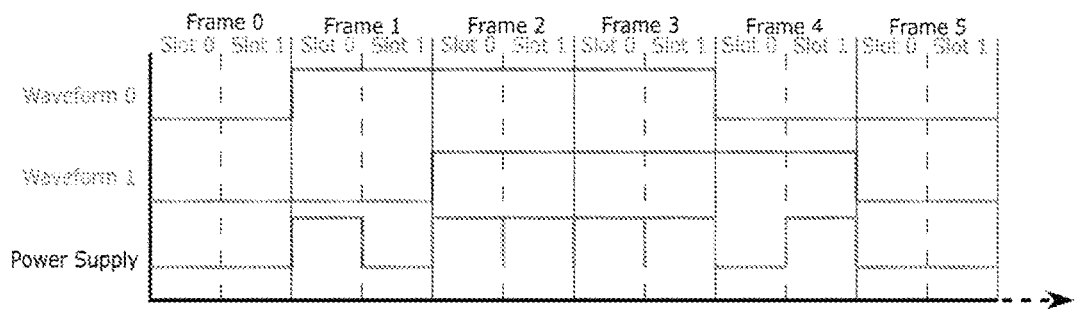
FIG. 15 shows a timing diagram illustrating scheduling of haptic feedback pulses.

In a further embodiment, the power supply is shared between actuators in a time division multiplex (TDM) manner. This is illustrated in FIG. 15. A frame structure is defined with a plurality of frames of fixed size. A typical frame size may be in the region of 50 μs. FIG. 15 shows a total of 6 frames (0 to 5), each one being split into 2 slots (0 and 1).

Each actuator is allocated a time slot inside each frame, with the size of the slot being dependent on the number of actuators supplied from the same power supply. For instance, if there are two actuators, then each one would be allocated half of the time within a frame. If required, for instance if the actuators concerned are of different sizes, the frame may be split accordingly e.g. 60:40 whereby the larger actuator is assigned the larger slot.

Time slots for different actuators do not overlap and each actuator can only be driven during its own allocated time slot within the frame. Pulse train 0 and pulse train 1 are shown as the desired input pulse trains. The lower trace (Power supply) shows the power output from the power supply. Slot 0 in each frame is 'high' when the corresponding pulse train 0 is high. Similarly, slot 1 in each frame is 'high' when the corresponding pulse train 1 is high.

In this way, the available power supply may be shared between any number of actuators by means of a TDM scheme, which assigns the requisite number of slots, which may be of uniform or non-uniform duration, as required.

In a further refinement, the duty of the pulse train or individual pulses can be varied to provide a greater degree of control. The duty can be adjusted to control how much of the available time within a particular slot is taken.

Figure 16:
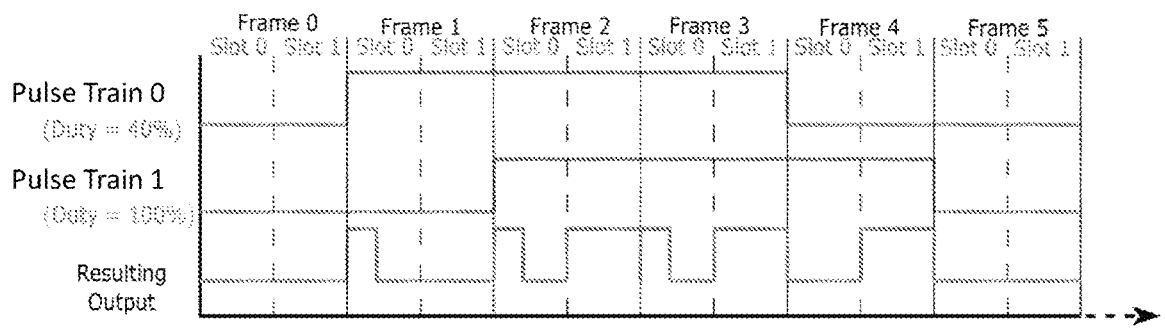
FIG. 16 shows a timing diagram illustrating scheduling of haptic feedback pulses.

This option is illustrated in FIG. 16, which shows the effect of altering the duty within particular slots to adjust the overall power applied to a specific actuator.

The upper trace shows Pulse train 0 with a required duty of 40%. The second trace shows Pulse train 1 with a required duty of 100%. The resulting output is shown in the lower trace. Whenever pulse train 0 is 'high', the output is high, but with the added feature that the required duty is taken into account, meaning that the slot is only 'high' for 40% of the allocated time. In this way, whenever pulse train 0 is 'high', the resultant output is 'high' but only for 40% of the time.

Since pulse train 1 has a required duty of 100%, each time it is 'high', then the resultant output is high for the entire slot.

It may be desirable to control the duty of individual pulses, rather than the entire pulse train. In this case, suitable signalling is provided to indicate this.

In either of the embodiments shown in FIGS. 15 and 16, individual actuators are able to receive half the instantaneous power that is available from the associated power supply. For instance, if the power supply is rated at 6 W, then each actuator is only able to receive 3 W. This is further reduced if more actuators share the same power supply.

An advantage of this arrangement is that each actuator is able to be driven independently of other actuators, with no interaction between them.

An advantage of applying the additional duty feature, as shown in FIG. 16, is that it is possible to control the power applied depending on the ambient temperature or to control the "sharpness" of a pulse/pulse train.

Figure 17:
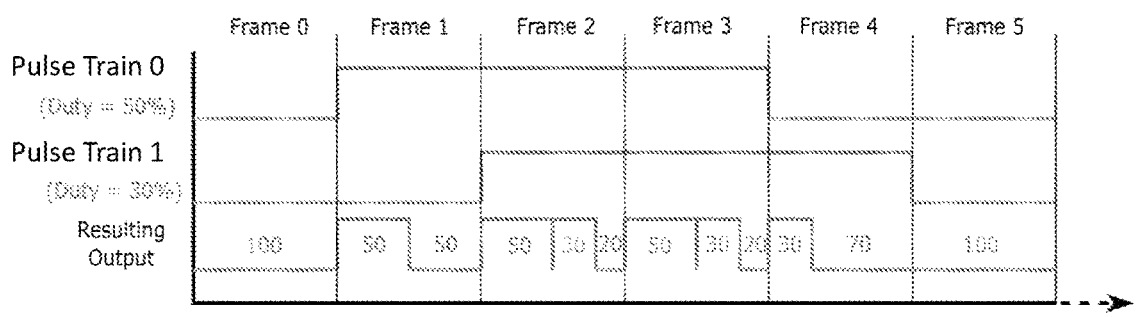
FIG. 17 shows a timing diagram illustrating scheduling of haptic feedback pulses.

A further embodiment is illustrated in FIG. 17, which relates to a dynamic TDM approach, which differs from the static TDM approach exemplified in FIGS. 15 and 16. Here, the slots are allocated in a dynamic manner dependent on the pulse trains or pulses which are active.

Here, each pulse train has an associated duty from 0 to 100%. The duty specifies how much time in a frame is required to drive the particular pulse train. The scheduler checks whether the power supply has enough duty time available before scheduling a new pulse train. In the event there is insufficient time available, then the new pulse train is ignored, delayed or the duty is reduced in order to fit the remaining time available. To achieve this, one or more of the schemes set out previously and illustrated in FIGS. 6 to 9, may be applied.

In FIG. 17, Pulse train 0 has a duty of 50% and Pulse train 1 has a duty of 30%. These duties are reflected in the lower trace, showing the resulting output from the power supply. When Pulse train 0 is 'high' slot 0 is high for its entire duration, which equals 50% of the frame duration. Similarly, when Pulse train 1 is 'high', slot 1 is high for 60% of its duration, which equals 30% of the frame duration. In this example, there is sufficient power available from the power supply. In other cases, as mentioned, it may be necessary to delay, ignore or adjust the duty of particular pulses or pulse trains.

In this particular embodiment, a particular actuator can draw up to 100% of the power available if no other actuators are active at the same time. As in the previous embodiment, by adjusting the duty, it is possible to control the power applied depending on the ambient temperature or to control the "sharpness" of a pulse/pulse train.

Figure 18:
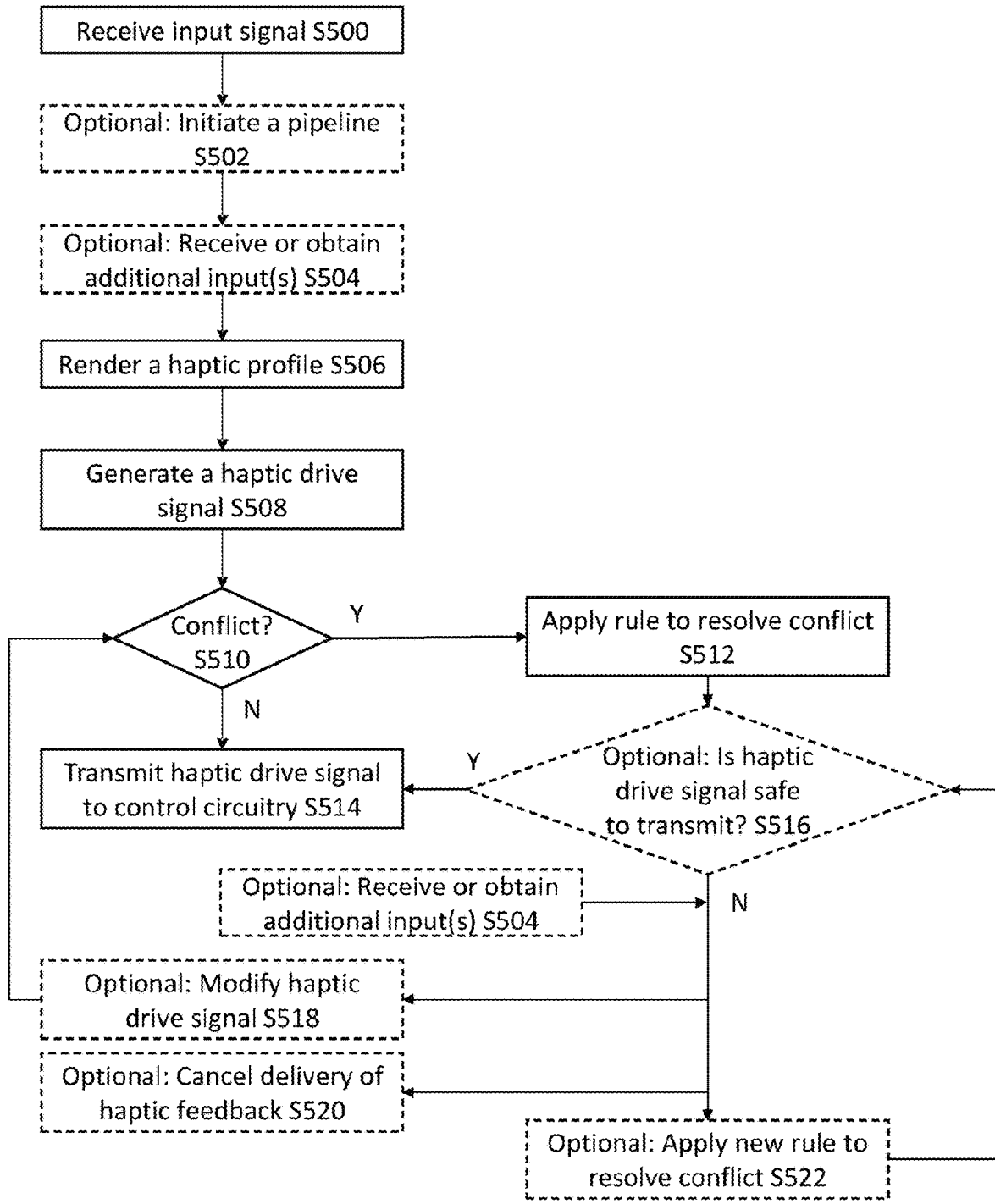
FIG. 18 shows a flowchart of a method for scheduling haptic feedback pulses.

FIG. 18 shows a flowchart which illustrates the general method of embodiments of the present techniques. It shows a flowchart of example steps to deliver haptic feedback. The process begins by receiving an input signal (step S500). The input signal may be received by a processor 202 of apparatus 200 or a dedicated processor of the haptic assembly 210 of apparatus 200. The input signal may be triggered by a software process or event taking place in the apparatus, or by receipt of a message by a communication protocol of the apparatus. In some cases, the input signal may be triggered by detection of contact on a pressable button or touch-sensitive portion of the apparatus. The input signal may only be triggered if a minimum threshold capacitance is sensed, force is applied or displacement of the button occurs.

The input signal comprises a request for haptic feedback to be delivered. Responsive to receiving the input signal, the processor 202 renders a haptic profile defining instructions for driving the at least one SMA actuator wire 212 of the haptic assembly 210 (step S506). The haptic profile may be rendered by selecting a pre-defined haptic profile, modifying a pre-defined haptic profile, or generating a generated haptic profile, as described above. The processor generates a haptic drive signal using the rendered haptic profile (step S508), and determines if there is a scheduling conflict (step S510), as has been described. If there is a conflict, then the conflict is resolved (step S512) by applying one or more predefined rules, as has been described in the foregoing.

At step S516, optionally, a check is made to ensure that the resolution, in terms of an adjusted pulse train, is safe to transmit to the actuator. As has been noted previously, in relation to FIG. 6 particularly, it is possible that the adjusted pulse train can result in a concentration of energy being supplied to a particular actuator which can exceed a safe level. The check at step S516 ensures that a predefined safe level is not exceeded. If the adjusted haptic drive signal is determined to be safe, or if there is no conflict, the processor transmits the generated haptic drive signal to control circuitry 214 to control the at least one SMA actuator wire 212 to deliver haptic feedback (step S514).

However, if the check at step S516 determines that it is not safe to transmit the haptic drive signal to the actuator, then one or more options may be pursued. Firstly, at step S518, optionally, the haptic drive signal may be modified, for instance by reducing the amplitude or duration of one or more pulses therein, such that the total energy delivered is reduced. Then a further conflict check is performed at step S510 and flow continues as before.

Secondly, at step S520, optionally, the haptic feedback process may be cancelled such that no haptic feedback is delivered in response to the current request.

Thirdly, at step S522, an alternative rule or conflict resolution scheme is applied, which may address the safety issue. After applying the new rule, flow returns to step S516 to re-check the safety of the new haptic drive signal.

Optionally, as part of the check performed at step S516, one or more additional inputs may be provided at S504, which may help to inform the check at step S516. For instance, an additional input may relate to a temperature of an SMA wire or its immediate vicinity. Such a temperature reading may indicate whether the wire in question is able to receive more than a certain amount of energy.

In relation to the check at step S516, a count may be kept of the number of times this is iterated so that an infinite loop is avoided. Once the count reaches a predetermined value, then flow is forced to a known safe condition, such as step S520.

Optionally, the process may comprise initiating a pipeline in response to receiving the input signal (step S502), as described above.

Optionally, the process may comprise receiving, or obtaining, one or more additional inputs (step S504), which may be used to initiate, modify or cancel a pipeline and/or render a haptic profile, as described above.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. An apparatus for delivering haptic feedback comprising:
    a plurality of actuators;
    control circuitry for controlling the plurality of actuators; and
    at least one processor, communicatively coupled to the control circuitry, to:
        receive an input signal requesting haptic feedback to be delivered;
        render a haptic profile defining instructions for driving each actuator of the plurality of actuators;
        generate a haptic drive signal using the rendered haptic profile; and
        transmit, to the control circuitry, the haptic drive signal to control each actuator of the plurality of actuators to deliver haptic feedback, wherein:
        responsive to receiving the input signal requesting the haptic feedback, the at least one processor renders a haptic event pipeline comprising at least one action to be performed;
        the haptic event pipeline is arranged to schedule a plurality of pulse trains each comprising one or more pulses, each pulse train of the plurality of pulse trains to be applied to a different actuator of the plurality of actuators;
        in case of a scheduling conflict, a scheduler applies one or more predefined rules to adjust one or more pulses of one or more of the plurality of pulse trains; and
        the scheduling conflict is between pulses of at least two of the plurality of pulse trains that are to be applied to different actuators.

2. The apparatus of claim 1, wherein the plurality of actuators comprises at least one of: a shape memory alloy (SMA) actuator; a piezoelectric actuator; an electroactive polymer (EAP) actuator; an electromechanical (EMP), EMP, actuator; a linear resonant actuator (LRA); and an eccentric rotating mass (ERM) actuator.

3. The apparatus of claim 1, wherein the scheduling conflict comprises one or more input signals requesting the haptic feedback which request a plurality of pulse trains to be scheduled such that at least part of two or more pulses of the at least two of the plurality of pulse trains occur simultaneously.

4. The apparatus of claim 1, wherein one of the one or more predefined rules prioritises a particular pulse according to a defined parameter associated with the particular pulse, wherein the defined parameter associated with the particular pulse includes one or more of: an explicit priority level assigned thereto, a start time, a pulse order, or a duration.

5. The apparatus of claim 4, wherein one of the one or more predefined rules prioritises all pulses according to their start time, such that rescheduled pulses are produced in the same order as they are requested, whereby if a pulse is delayed as a result, it follows after the end of the preceding pulse and pulse width is not altered.

6. The apparatus of claim 4, wherein one of the one or more predefined rules prioritises all pulses according to their start time, such that rescheduled pulses are produced in the same order as they are requested, whereby if a pulse is delayed as a result, it follows after the end of the preceding pulse and if a pulse in a particular pulse train is delayed, subsequent pulses in the particular pulse train are delayed by the same amount and pulse width is not altered.

7. The apparatus of claim 4, wherein one of the one or more predefined rules prioritises all pulses according to their start time and a later pulse, if it conflicts with an earlier pulse is either truncated or omitted entirely depending on a duration of the earlier pulse.

8. The apparatus of claim 4, wherein one of the one or more predefined rules adds pulses of one pulse train following a preceding pulse train.

9. The apparatus of claim 4, wherein one of the one or more predefined rules assigns a priority to each of several pulses of the plurality of pulse trains to be scheduled, such that pulses having a higher priority are scheduled first and pulses having a lower priority are scheduled when the pulses having the higher priority are complete.

10. The apparatus of claim 9, wherein all pulses in a particular pulse train have the same priority.

11. The apparatus of claim 4, wherein one of the one or more predefined rules splits available power between different actuators such that if there is no overlap between pulses in different pulse trains, maximum power is available as requested, and if there is an overlap between pulses in different pulse trains, power is divided between the pulses in the different pulse trains and duration of the pulses is adjusted to maintain requested total energy.

12. The apparatus of claim 4, wherein one of the one or more predefined rules assigns a priority to each of several pulse trains to be scheduled, such that pulses in a pulse train having a higher priority pre-empt pulses in a pulse train having a lower priority, interrupting pulses in the pulse train having a lower priority and whereby a duration of one or more pulses in the pulse train having a lower priority are adjusted to maintain requested total energy.

13. The apparatus of claim 4, wherein available power is time division multiplexed between different possible actuators such that a plurality of slots are defined, with each such slot being associated with a particular actuator, wherein power is applied to a particular actuator only during its associated slot.

14. The apparatus of claim 13, wherein the plurality of slots are of equal duration, wherein a pulse train associated with each of the different possible actuators has an associated duty, whereby power is provided during a respective slot in accordance with the associated duty.

15. The apparatus of claim 13, wherein the plurality of slots are of unequal duration, defined by a duty of one or more pulses in a pulse train associated with each of the actuators.

16. A method for delivering haptic feedback using a plurality of actuators, the method comprising:
   receiving an input signal requesting haptic feedback to be delivered;
   rendering a haptic profile defining instructions for driving each actuator of the plurality of actuators;
   generating a haptic drive signal using the rendered haptic profile; and
   transmitting the haptic drive signal to control each actuator of the plurality of actuators to deliver haptic feedback, wherein:
      responsive to receiving the input signal requesting the haptic feedback, at least one processor renders a haptic event pipeline comprising at least one action to be performed;
      the haptic event pipeline is arranged to schedule a plurality of pulse trains each having one or more pulses, each pulse train of the plurality of pulse trains to be applied to a different actuator of the plurality of actuators;
      in case of a scheduling conflict, one or more predefined rules are applied to adjust one or more pulses of one or more of the plurality of pulse trains; and
      the scheduling conflict is between pulses of at least two of the plurality of pulse trains that are to be applied to different actuators.

17. The method of claim 16, wherein after applying the one or more predefined rules, a check is made to determine if the adjusted one or more pulses are safe to transmit to a corresponding one or more actuators of the plurality of actuators.

18. The method of claim 17, wherein if it is determined that it is not safe to transmit the adjusted one or more pulses then: an alternative predefined rule is applied; or one or more pulses of the one or more of the plurality of pulse trains pulses are modified; or delivery of the haptic feedback is cancelled.

19. The method of claim 17, wherein one or more additional inputs are received as part of the check to determine if the adjusted one or more pulses are safe to transmit to the corresponding one or more actuators, wherein the one or more additional inputs comprises information relating to the temperature of a given actuator or its immediate vicinity.

20. A non-transitory data carrier carrying processor control code to implement the method of claim 17.

* * * * *